United States Patent
Islam et al.

(10) Patent No.: US 10,116,483 B2
(45) Date of Patent: Oct. 30, 2018

(54) DYNAMICALLY CONVEY INFORMATION OF DEMODULATION REFERENCE SIGNAL AND PHASE NOISE COMPENSATION REFERENCE SIGNAL

(71) Applicant: QUALCOMM Incorporated, San Diego, CA (US)

(72) Inventors: Muhammad Nazmul Islam, Edison, NJ (US); Tao Luo, San Diego, CA (US); Juergen Cezanne, Ocean Township, NJ (US); Krishna Kiran Mukkavilli, San Diego, CA (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/370,266

(22) Filed: Dec. 6, 2016

(65) Prior Publication Data
US 2017/0302495 A1    Oct. 19, 2017

Related U.S. Application Data

(60) Provisional application No. 62/324,135, filed on Apr. 18, 2016.

(51) Int. Cl.
*H04L 27/26* (2006.01)
*H04L 5/00* (2006.01)
(Continued)

(52) U.S. Cl.
CPC ........ *H04L 27/2688* (2013.01); *H04L 5/0048* (2013.01); *H04L 5/0051* (2013.01);
(Continued)

(58) Field of Classification Search
CPC ....... H04W 4/06; H04W 8/005; H04W 24/10; H04W 14/08; H04W 48/16;
(Continued)

(56) References Cited

U.S. PATENT DOCUMENTS

| 2013/0039291 A1* | 2/2013 | Blankenship | ........... H04L 5/001 370/329 |
| 2013/0039316 A1* | 2/2013 | Kwon | .................. H04J 11/0023 370/329 |

(Continued)

OTHER PUBLICATIONS

Ericsson: "Verizon 5G TF, Air Interface Working Group, Verizon 5th Generation Radio Access, Physical channels and modulation (Release 1)", TS V5G.211 V1.3 (Jun. 2016), pp. 1-79.
(Continued)

*Primary Examiner* — Jean A Gelin
(74) *Attorney, Agent, or Firm* — Arent Fox LLP

(57) ABSTRACT

DM-RS symbols may be inserted in the beginning of a subframe, or in two parts of the subframe. In one aspect, a method, a computer-readable medium, and an apparatus for dynamically conveying DM-RS information are provided. The apparatus may be a base station. The apparatus may determine the number of DM-RS symbols and/or the locations within a subframe for transmission of the DM-RS symbols. The apparatus may transmit the number of the DM-RS symbols and/or the locations within the subframe for transmission of the DM-RS symbols to a UE. In another aspect, a UE may receive the number of DM-RS symbols and/or the locations within a subframe for transmission of the DM-RS symbols from a base station. The UE may decode the DM-RS symbols from the subframe based on the number of the DM-RS symbols and/or the locations within a subframe for transmission of the DM-RS symbols.

76 Claims, 16 Drawing Sheets

(51) Int. Cl.
*H04W 72/04* (2009.01)
*H04W 76/27* (2018.01)
*H04W 88/02* (2009.01)
*H04W 88/08* (2009.01)

(52) U.S. Cl.
CPC .......... *H04L 5/0094* (2013.01); *H04L 27/266* (2013.01); *H04L 27/2613* (2013.01); *H04L 27/2675* (2013.01); *H04W 72/042* (2013.01); *H04W 76/27* (2018.02); *H04L 5/0053* (2013.01); *H04L 5/0085* (2013.01); *H04W 88/02* (2013.01); *H04W 88/08* (2013.01)

(58) Field of Classification Search
CPC ............. H04W 52/143; H04W 52/243; H04W 52/245; H04W 52/42; H04W 72/0446; H04W 72/1231; H04W 72/04; H04W 72/042
USPC ..... 455/450, 452.1, 452.2, 449, 44, 45, 501, 455/509, 511
See application file for complete search history.

(56) References Cited

U.S. PATENT DOCUMENTS

| | | | |
|---|---|---|---|
| 2013/0070693 A1* | 3/2013 | Kwon | H04L 5/001 370/329 |
| 2013/0136095 A1* | 5/2013 | Nishio | H04L 5/0007 370/329 |
| 2014/0023155 A1 | 1/2014 | Khoryaev et al. | |
| 2014/0169434 A1* | 6/2014 | Hewavithana | H04L 27/2647 375/232 |
| 2014/0177485 A1* | 6/2014 | Wang | H04L 1/00 370/280 |
| 2014/0177532 A1* | 6/2014 | Kim | H04W 52/245 370/328 |
| 2015/0016239 A1* | 1/2015 | Yi | H04J 11/003 370/201 |
| 2015/0036560 A1* | 2/2015 | Kim | H04W 72/0406 370/280 |
| 2015/0155993 A1* | 6/2015 | Berggren | H04L 5/0023 370/330 |
| 2015/0304995 A1* | 10/2015 | Yi | H04L 5/001 370/329 |
| 2015/0327226 A1* | 11/2015 | Cheng | H04W 72/1289 370/329 |
| 2015/0373739 A1* | 12/2015 | Seo | H04W 72/04 370/329 |
| 2016/0006548 A1* | 1/2016 | Yang | H04L 5/0094 370/329 |
| 2016/0043848 A1 | 2/2016 | Kim | |
| 2016/0050647 A1* | 2/2016 | Hwang | H04L 12/4641 370/329 |
| 2016/0087709 A1 | 3/2016 | Horiuchi et al. | |
| 2016/0174213 A1 | 6/2016 | Webb et al. | |
| 2016/0309338 A1 | 10/2016 | Wang et al. | |
| 2016/0330064 A1* | 11/2016 | Kamiya | H04L 27/0014 |
| 2017/0094531 A1* | 3/2017 | Kakishima | H04W 16/28 |
| 2017/0094647 A1* | 3/2017 | Ko | H04W 72/042 |

OTHER PUBLICATIONS

International Search Report and Written Opinion—PCT/US2017/023432—ISA/EPO—dated Sep. 25, 2017.
LG Electronics: "Remaining Issues on M-PDCCH Transmission", 3GPP TSG RAN WG1 Meeting #83, R1-156840, Nov. 15, 2015, XP051003196, Retrieved from the Internet: URL:http://www.3gpp.org/ftp/Meetings_3GPP_SYNC/RAN1/Docs/, 5 pages.
NTT DOCOMO et al., "Initial Views on Numerology for NR Access Techonology", 3GPP TSG RAN WG1 Meeting #84bis, R1-163113, Apr. 1, 2016, XP051079875, Retrieved from the Internet: URL:http://www.3gpp.org/ftp/tsg_ran/WG1_RL1/TSGR1_84b/Docs/, 12 pages.
Session Chairman (Alcatel-Lucent): "Chairman's Notes of Agenda Item 7.2.1 on NB-loT", 3GPP TSG RAN WG1 Meeting #84, R1-161543, Feb. 24, 2016, XP051079447, Retrieved from the Internet: URL:http://www.3gpp.org/ftp/tsg_ran/WG1_RL1/TSGR1 84/Docs/, 14 pages.
International Search Report and Written Opinion—PCT/US2017/023432—ISA/EPO—dated Jul. 13, 2017.
Mitsubishi Electric., "Impact of scalable bandwidth and multiple camping positions on modulation parameters," 3GPP Draft; R1-961795, 3rd Generation Partnership Project (3GPP), Mobile Competence Centre ; 659, Route Des Lucioles ; F-96921 Sophia-Antipolis Cedex; France, vol. RAN WG1, No. Cannes, France; 299696277-29969639, Jun. 19, 2006(Jun. 19, 2006), XP959951972, pp. 12 pages. Retrieved from the Internet: URL:http://www.3gpp.org/ftp/tsg_ran/WG1_RL1/TSGR1 AH/LTE AH 9696/Docs/[retrieved on 2996-96-19].
Nikolay N.,et al., "Enhanced Algorithm for Digital Mitigation of ICI Due to Phase Noise in OFDM Receivers," IEEE Wireless Communications Letters, IEEE, Piscataway, NJ, USA, vol. 2(1), Feb. 1, 2013 (Feb. 1, 2013), XP911495689, pp. 6-9, ISSN: 2162-2337, DOI:19.1199/WCL.2912.991912.129412.

* cited by examiner

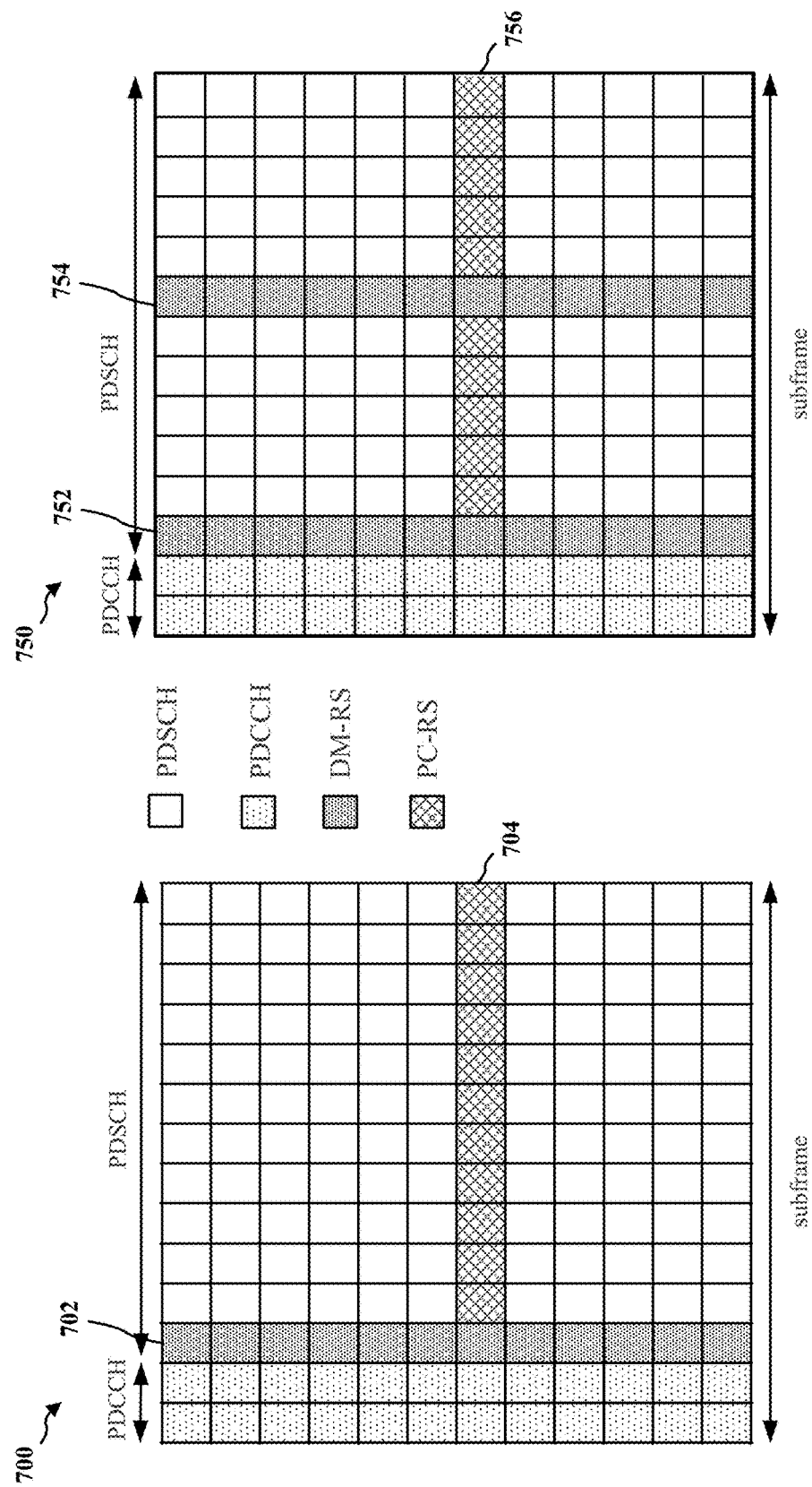

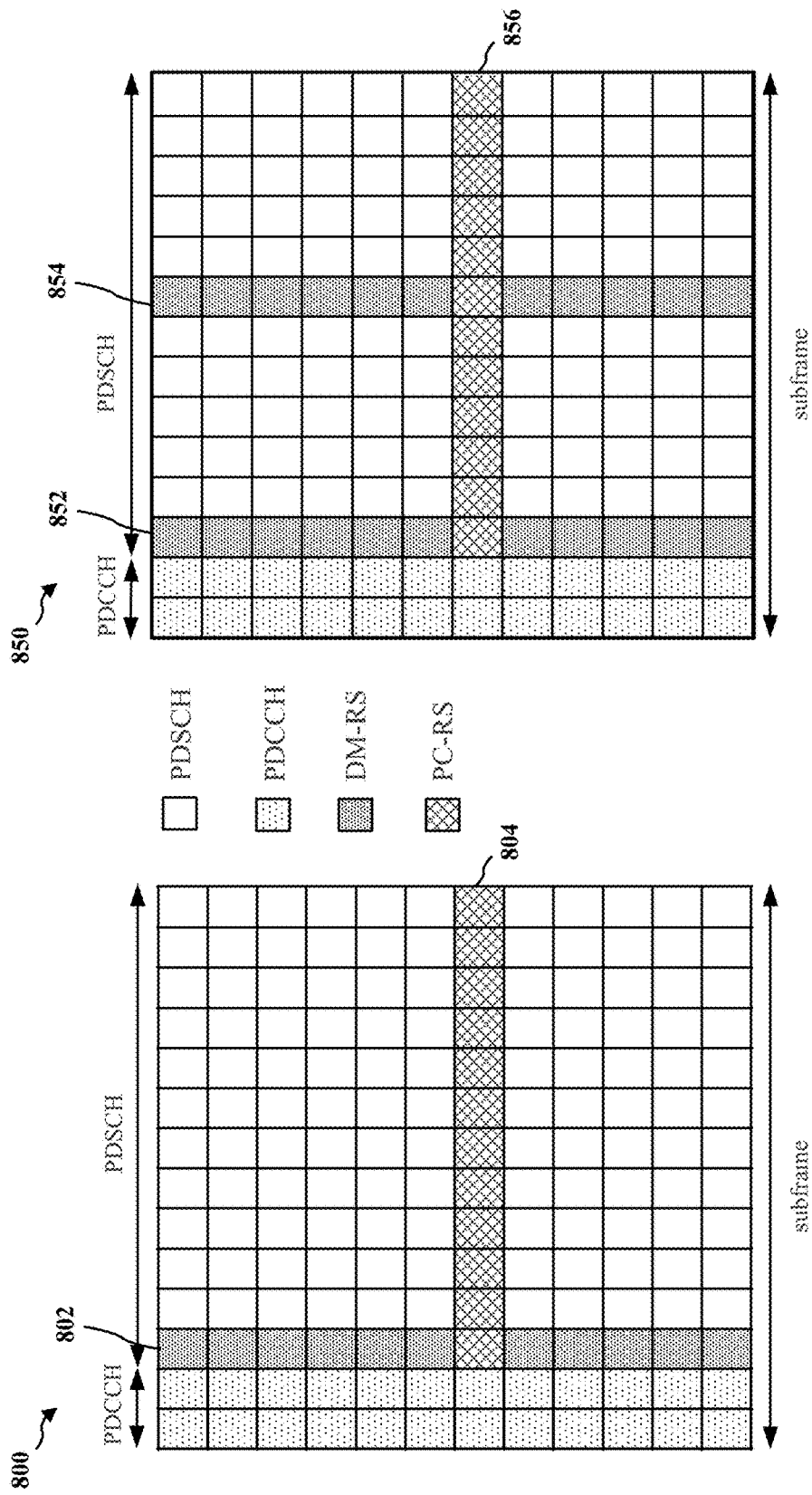

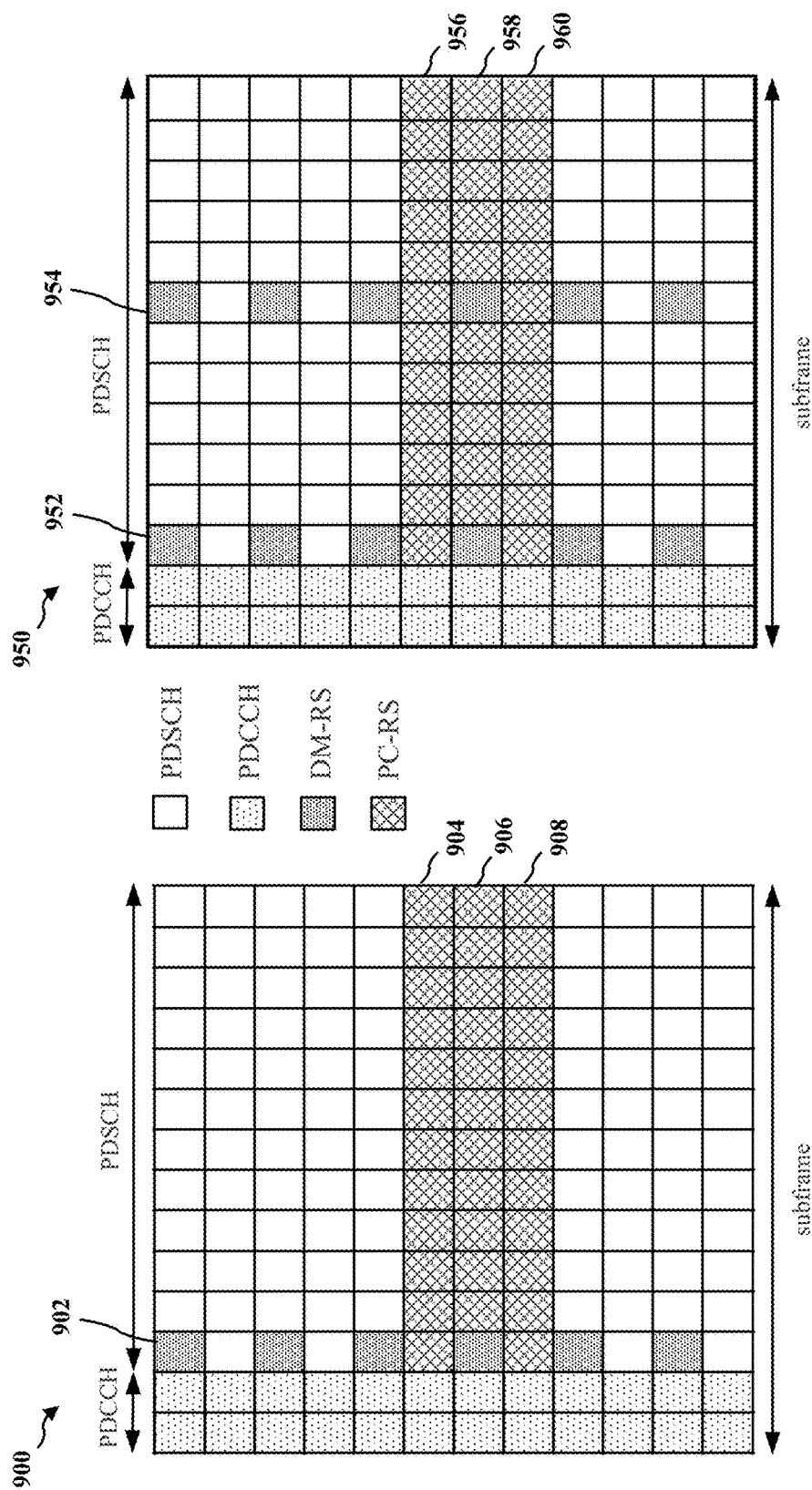

DYNAMICALLY CONVEY INFORMATION OF DEMODULATION REFERENCE SIGNAL AND PHASE NOISE COMPENSATION REFERENCE SIGNAL

CROSS-REFERENCE TO RELATED APPLICATION(S)

This application claims the benefit of U.S. Provisional Application Ser. No. 62/324,135, entitled "DYNAMICALLY CONVEY INFORMATION OF DM-RS AND PC-RS" and filed on Apr. 18, 2016, which is expressly incorporated by reference herein in its entirety.

BACKGROUND

Field

The present disclosure relates generally to communication systems, and more particularly, to dynamically conveyance of information regarding demodulation reference signal (DM-RS) and phase noise compensation reference signal (PC-RS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

DM-RS symbols may be inserted in physical downlink shared channel (PDSCH) or physical uplink shared channel (PUSCH) for channel estimation. Data may be decoded after decoding the DM-RS symbols. It may be preferable to insert DM-RS symbols in the beginning of the PDSCH/PUSCH from a latency perspective. However, in a fast time varying channel, estimated channel may become redundant or invalid for data carried near the end of PDSCH/PUSCH if DM-RS symbols are placed at the beginning of PDSCH/PUSCH.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It may be preferable to insert DM-RS symbols in the beginning of PDSCH/PUSCH from a latency perspective. However, in a fast time-varying channel, estimated channel may become redundant or invalid for data carried near the end of PDSCH/PUSCH if DM-RS symbols are placed at the beginning of PDSCH/PUSCH, respectively. Therefore, placing DM-RS symbols in two parts of the PDSCH/PUSCH may be desirable.

In an aspect of the disclosure, a method, a computer-readable medium, and an apparatus for wireless communication are provided. The apparatus may be a base station. The apparatus may determine at least one of the number of one or more DM-RS symbols or one or more locations within a subframe for transmission of the one or more DM-RS symbols. The apparatus may transmit the at least one of the number of the one or more DM-RS symbols or the one or more locations within the subframe for transmission of the one or more DM-RS symbols to a UE. The apparatus may determine a resource allocation scheme for a PC-RS. The apparatus may transmit the resource allocation scheme for the PC-RS to the UE.

In another aspect of the disclosure, a method, a computer-readable medium, and an apparatus for wireless communication are provided. The apparatus may be a base station. The apparatus may determine information to be conveyed by a physical downlink control channel (PDCCH). The apparatus may transmit the information to a UE via the PDCCH. The PDCCH may be punctured to accommodate a PC-RS.

In yet another aspect of the disclosure, a method, a computer-readable medium, and an apparatus for wireless communication are provided. The apparatus may be a UE. The apparatus may receive at least one of the number of one or more DM-RS symbols or one or more locations within a subframe for transmission of the one or more DM-RS symbols from a base station. The apparatus may decode the one or more DM-RS symbols from the subframe based on the at least one of the number of the one or more DM-RS symbols or the one or more locations within the subframe. The apparatus may receive a resource allocation scheme for a PC-RS. The apparatus may decode the PC-RS from the subframe based on the resource allocation scheme for the PC-RS.

In yet another aspect of the disclosure, a method, a computer-readable medium, and an apparatus for wireless communication are provided. The apparatus may be a UE. The apparatus may receive a first information via a PDCCH from a base station. The PDCCH may be punctured to accommodate a PC-RS. The apparatus may extract a second information from a subframe based on the first information.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7A is a diagram illustrating an example of resource allocation scheme for PC-RS with regard to DM-RS symbols within a subframe.

FIG. 7B is a diagram illustrating another example of resource allocation scheme for PC-RS with regard to DM-RS symbols within a subframe.

FIG. 8A is a diagram illustrating an example of resource allocation scheme for PC-RS with regard to DM-RS symbols within a subframe.

FIG. 8B is a diagram illustrating another example of resource allocation scheme for PC-RS with regard to DM-RS symbols within a subframe.

FIG. 9A is a diagram illustrating an example of resource allocation scheme for PC-RS with regard to DM-RS symbols within a subframe.

FIG. 9B is a diagram illustrating another example of resource allocation scheme for PC-RS with regard to DM-RS symbols within a subframe.

DETAILED DESCRIPTION

Figure 1:
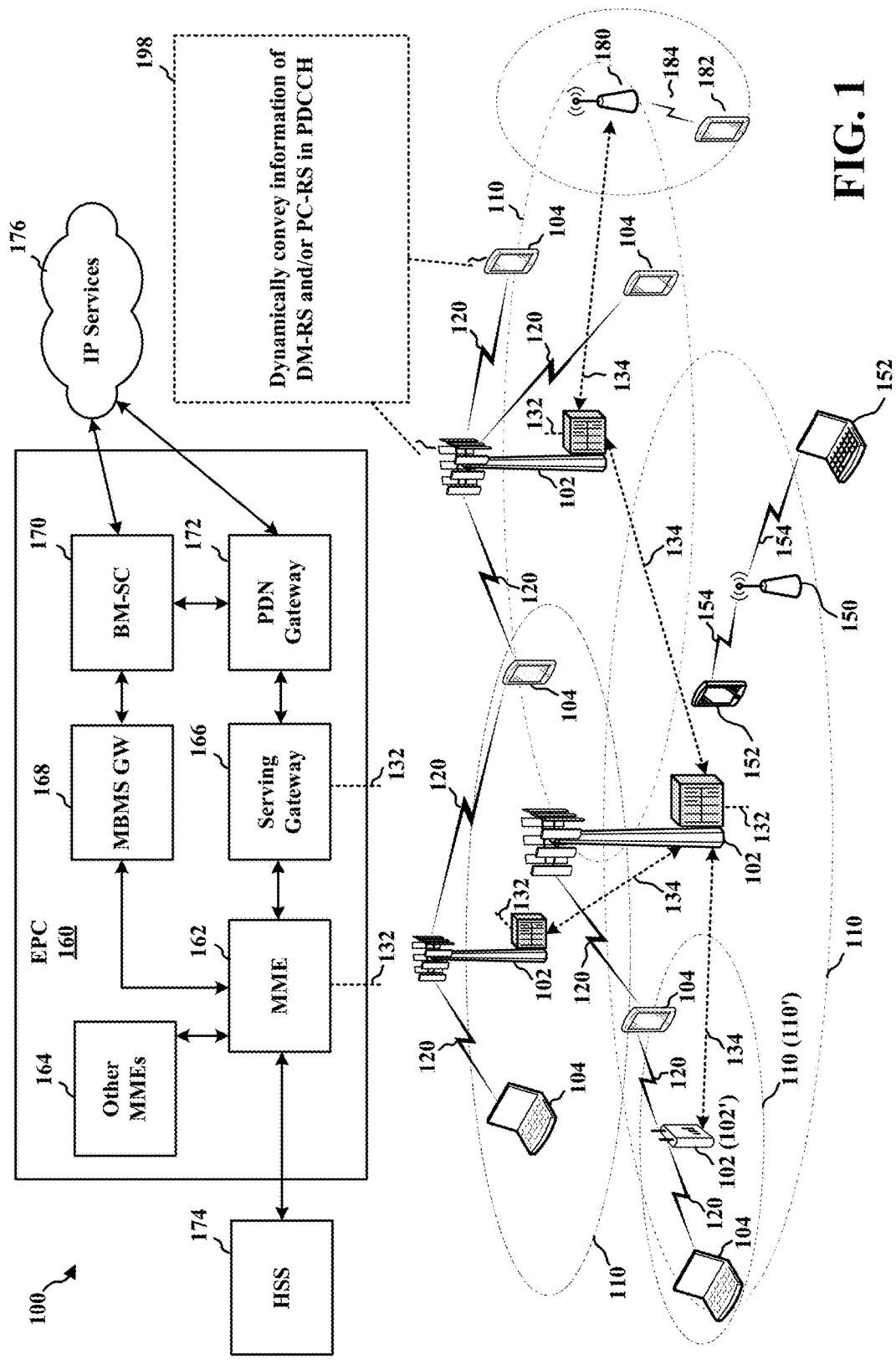
FIG. 1 is a diagram illustrating an example of a wireless communications system and an access network.
Figure 2:
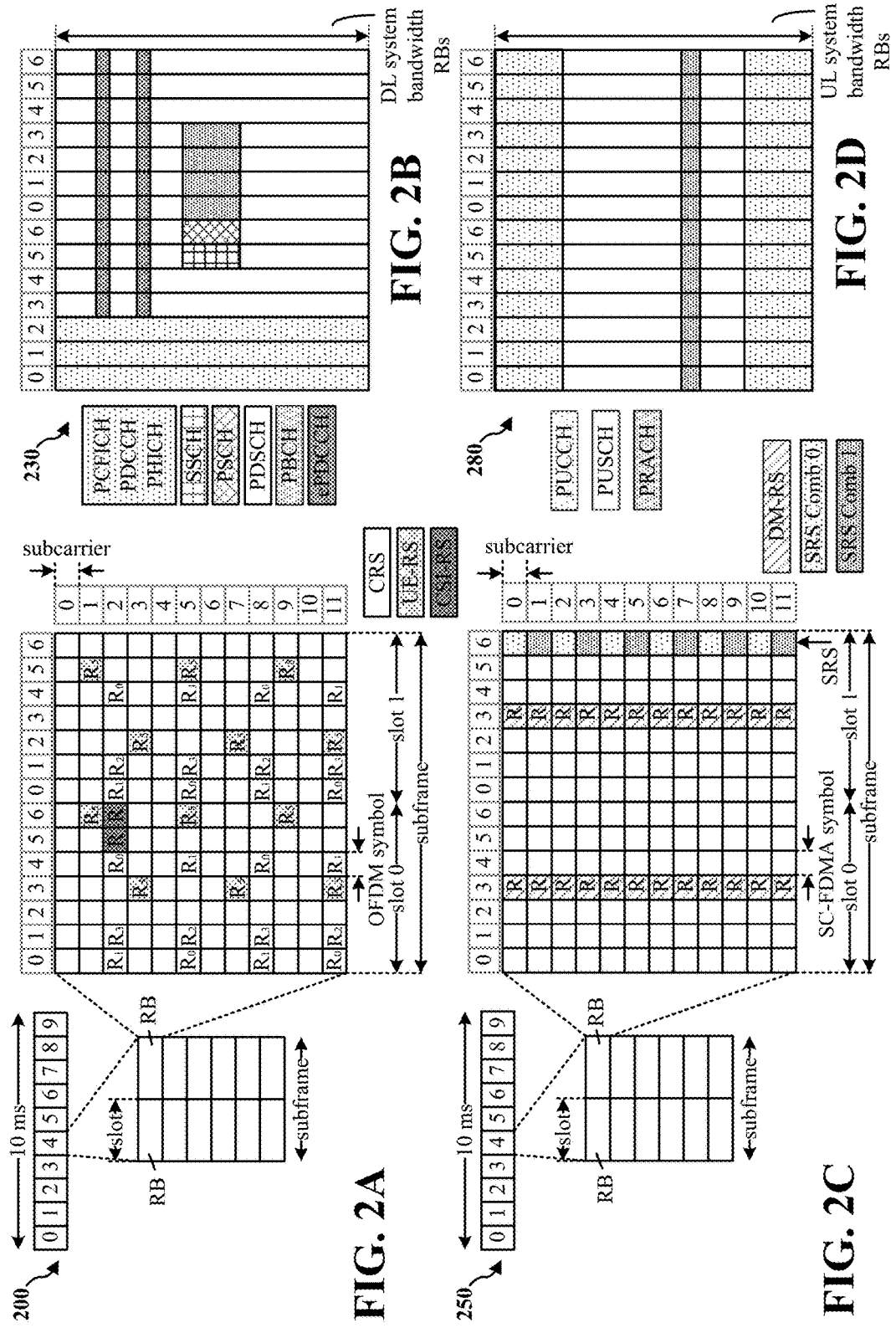
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to dynamically convey (198) information of DM-RS and/or PC-RS in physical downlink control channel (PDCCH). Details of the operations performed at 198 are described below with reference to FIGS. 2-16.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
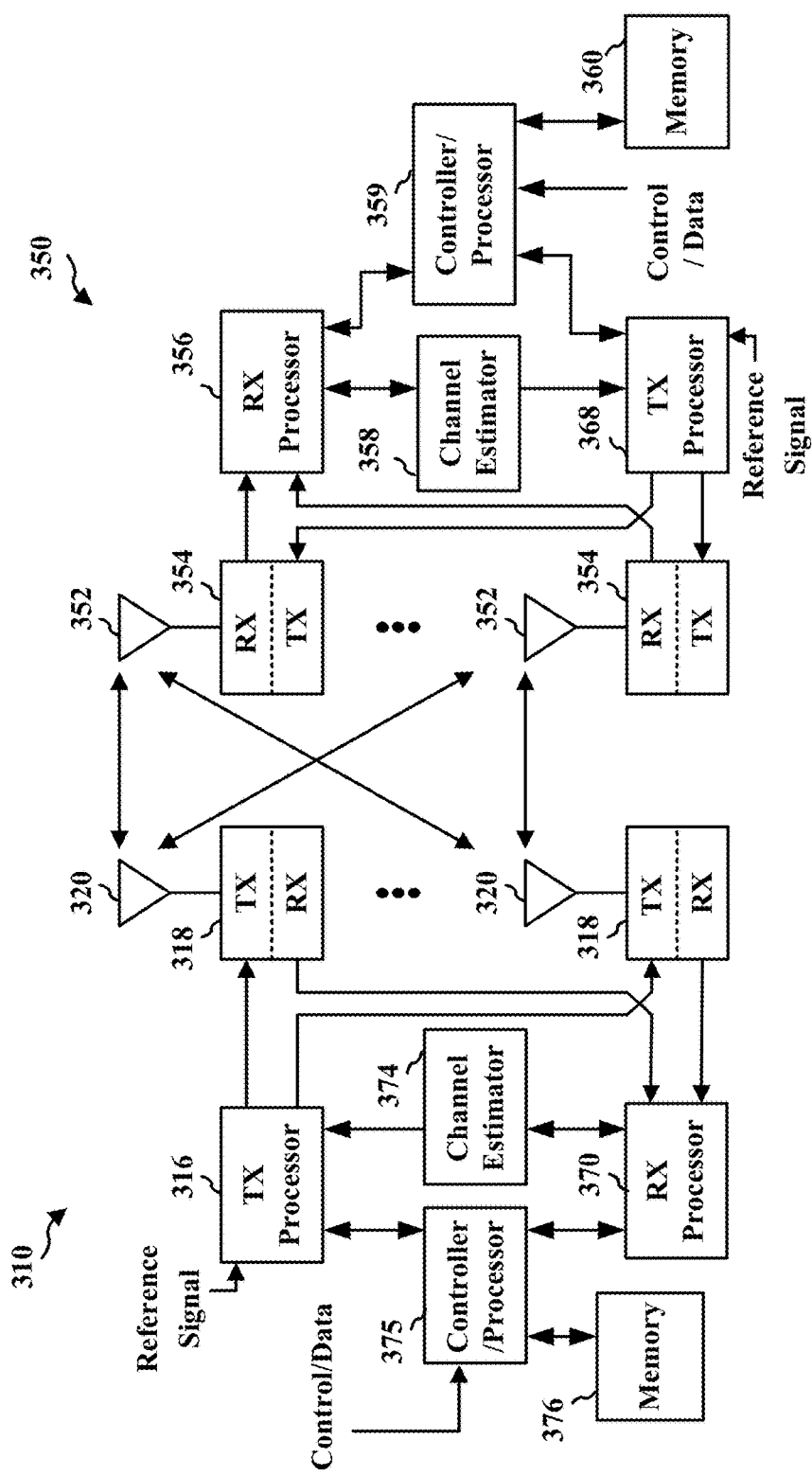
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

DM-RS symbols may be inserted in PDSCH or PUSCH for channel estimation.

Data may be decoded after decoding the DM-RS pilot signals. It may be preferable to insert DM-RS symbols in the beginning of PDSCH/PUSCH from a latency perspective. However, in a fast time-varying channel, estimated channel may become redundant or invalid for data carried near the end of PDSCH/PUSCH if DM-RS symbols are placed at the beginning of PDSCH/PUSCH, respectively. Therefore, placing DM-RS symbols in two parts of the PDSCH/PUSCH may be desirable.

Figure 4:
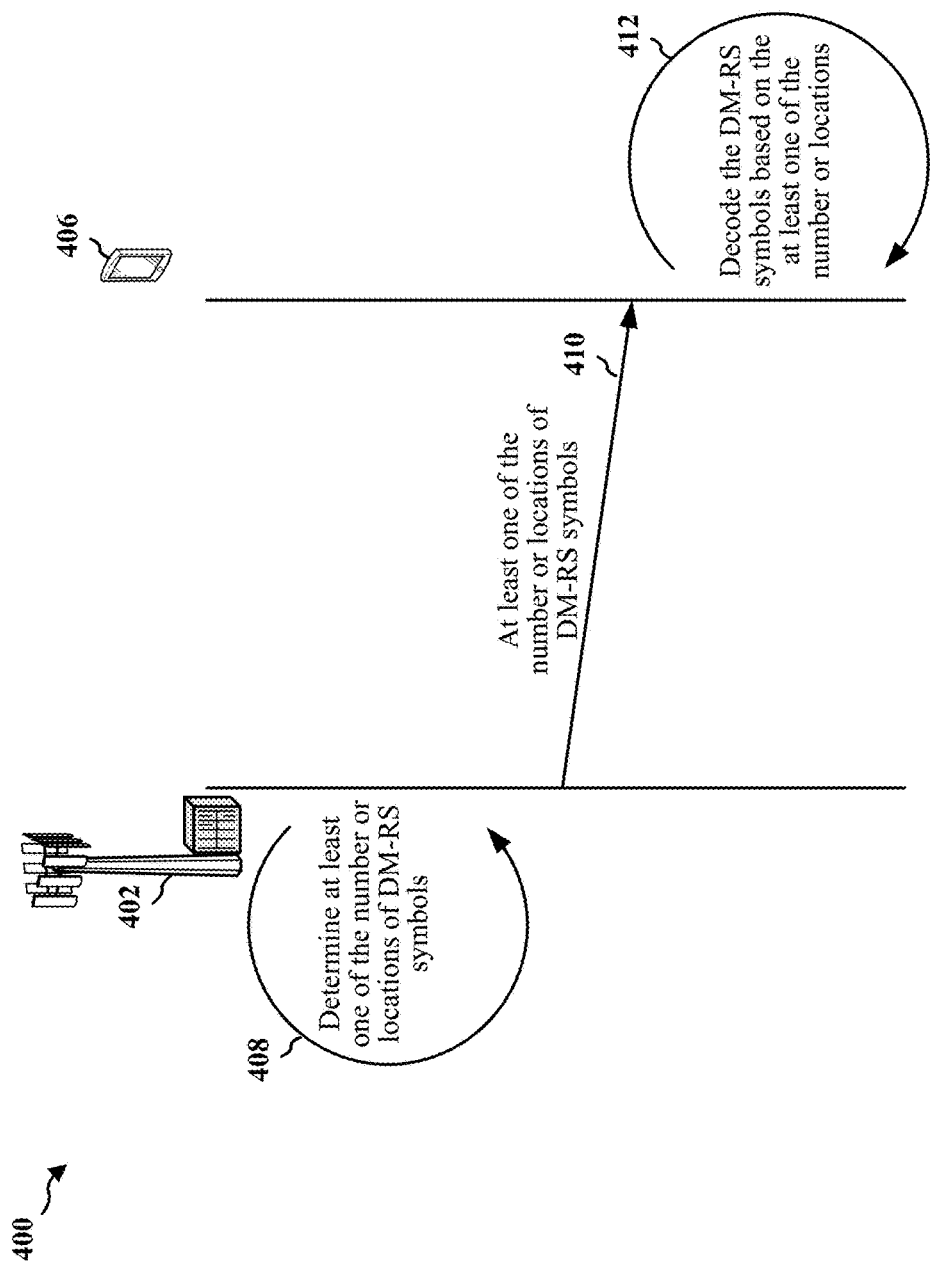
FIG. 4 is a diagram illustrating an example of dynamically conveying information of DM-RS in a wireless communication system.

FIG. 4 is a diagram illustrating an example of dynamically conveying information of DM-RS in a wireless communication system 400. In this example, the wireless communication system 400 includes a base station 402 and a UE 406. The base station 402 may determine (at 408) at least one of the number of DM-RS symbols (e.g., 1 or 2) in a subframe or the locations of the DM-RS symbols in the subframe. For example and in one configuration, there may be only one single DM-RS symbol in a subframe, and that single DM-RS symbol may be placed at the beginning of PDSCH or PUSCH. In another configuration, there may be two DM-RS symbols in a subframe, one of the two DM-RS symbols may be placed at the beginning of PDSCH, and the other DM-RS symbol may be placed in the middle of PDSCH. In yet another configuration, there may be two DM-RS symbols in a subframe, one of the two DM-RS symbols may be placed at the beginning of PUSCH, and the other DM-RS symbol may be placed in the middle of PUSCH. The base station 402 may change the number and/or locations of DM-RS symbols dynamically based on information obtained by the base station 402 at any particular moment.

Upon the determination of at least one of the number of DM-RS symbols or the locations of the DM-RS symbols within a subframe, the base station 402 may transmit (at 410) the determined at least one of the number of DM-RS symbols in a subframe or the locations of DM-RS symbols in the subframe to the UE 406. In one configuration, the determined at least one of the number or locations of DM-RS symbols in a subframe may be dynamically conveyed to the UE 406 via PDCCH of the same subframe. In one configuration, one or more bits may be reserved in DCI to convey the at least one of the number or location information of DM-RS symbols to the UE 406. For example and in one configuration, one bit may be reserved in DCI to indicate the number of DM-RS symbols in a subframe. In one configuration, one bit may be reserved in DCI to indicate the locations of DM-RS symbols in a subframe. In another configuration, at least one of the determined number or locations of DM-RS symbols in a subframe are conveyed to the UE 406 via RRC signaling.

Once the UE 406 receives the at least one of the number or locations of DM-RS symbols within a subframe from the base station 402, the UE 406 may decode (at 412) the DM-RS symbols from the subframe based on the at least one of the received number or locations of DM-RS symbols. As a result, the UE 406 may be dynamically informed of the base station's decision regarding at least one of the number or locations of DM-RS symbols, thus being able to decode the DM-RS symbols accordingly.

Figure 5B:
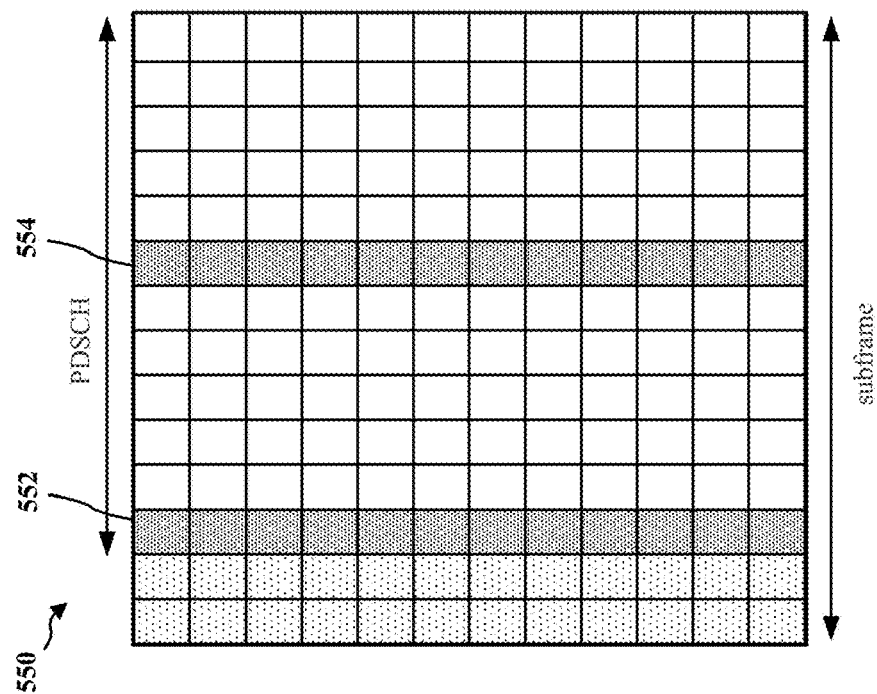
FIG. 5B is a diagram illustrating another example of resource allocation scheme for DM-RS symbols within a subframe.
Figure 5A:
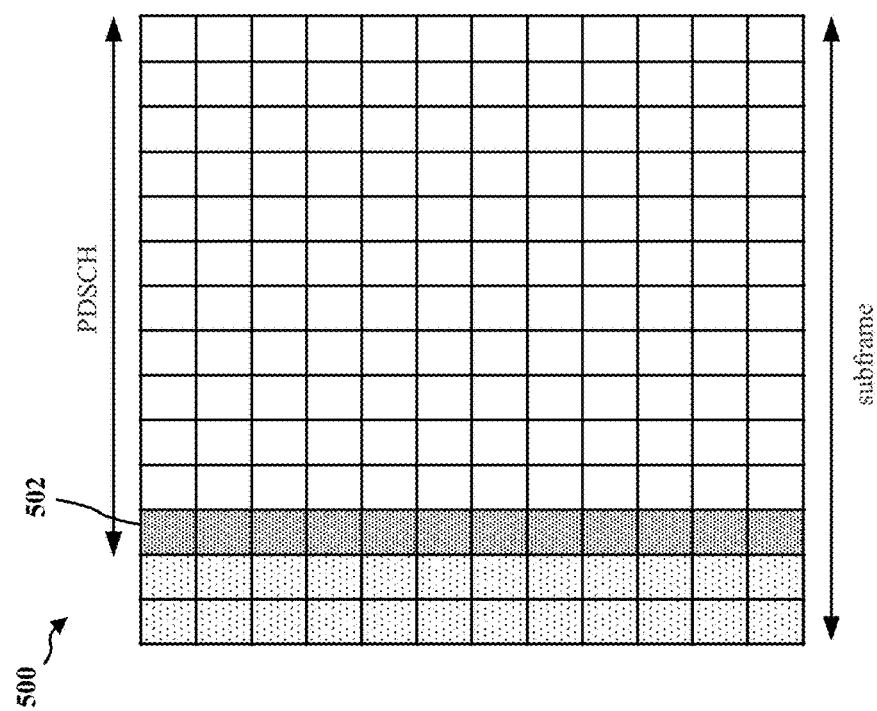
FIG. 5A is a diagram illustrating an example of resource allocation scheme for DM-RS symbols within a subframe.

FIG. 5A is a diagram 500 illustrating an example of resource allocation scheme for DM-RS symbols within a subframe. In this example, a single DM-RS symbol 502 is placed at the beginning (e.g., the first symbol) of PDSCH. Because data may be decoded after decoding DM-RS symbol, placing the DM-RS symbol 502 at the beginning of PDSCH may result in low latency.

FIG. 5B is a diagram 550 illustrating another example of resource allocation scheme for DM-RS symbols within a subframe. In this example, a first DM-RS symbol 552 is placed at the beginning (e.g., the first symbol) of PDSCH, and a second DM-RS symbol 554 is placed in the middle (e.g., the $7^{th}$ symbol) of PDSCH. In a fast time-varying channel, the resource allocation scheme illustrated in FIG. 5B may make channel estimation more accurate. In one configuration, the base station 402 described above in FIG. 4 may switch between the resource allocation schemes illustrated in FIGS. 5A and 5B based on information obtained by the base station 402 at any particular moment. In one configuration, the number or locations of DM-RS symbols in a subframe conveyed from the base station 402 to the UE 406 may correspond to one of the resource allocation schemes illustrated in FIGS. 5A and 5B that is being used by the base station 402.

Millimeter wave (MMW) radios may have higher phase noise levels than sub-6 GHz radios. This may be due to a higher frequency ratio between local oscillator and temperature compensated crystal oscillator, and noisier voltage controlled oscillators. UEs (e.g., receivers in downlink) may cause the majority of phase noise in a communication system. Phase noise may cause variations in phase over the duration of a single symbol. In the worst case scenario, phase variation within one symbol may be substantial. Phase noise compensation reference signal (PC-RS) may allow a UE to estimate phase noise, thus reducing radio frequency impairments caused by phase noise. A base station may determine different resource allocation schemes for transmitting PC-RS to a UE. A base station may switch from one resource allocation scheme for PC-RS to another resource allocation scheme for PC-RS at times.

Figure 6:
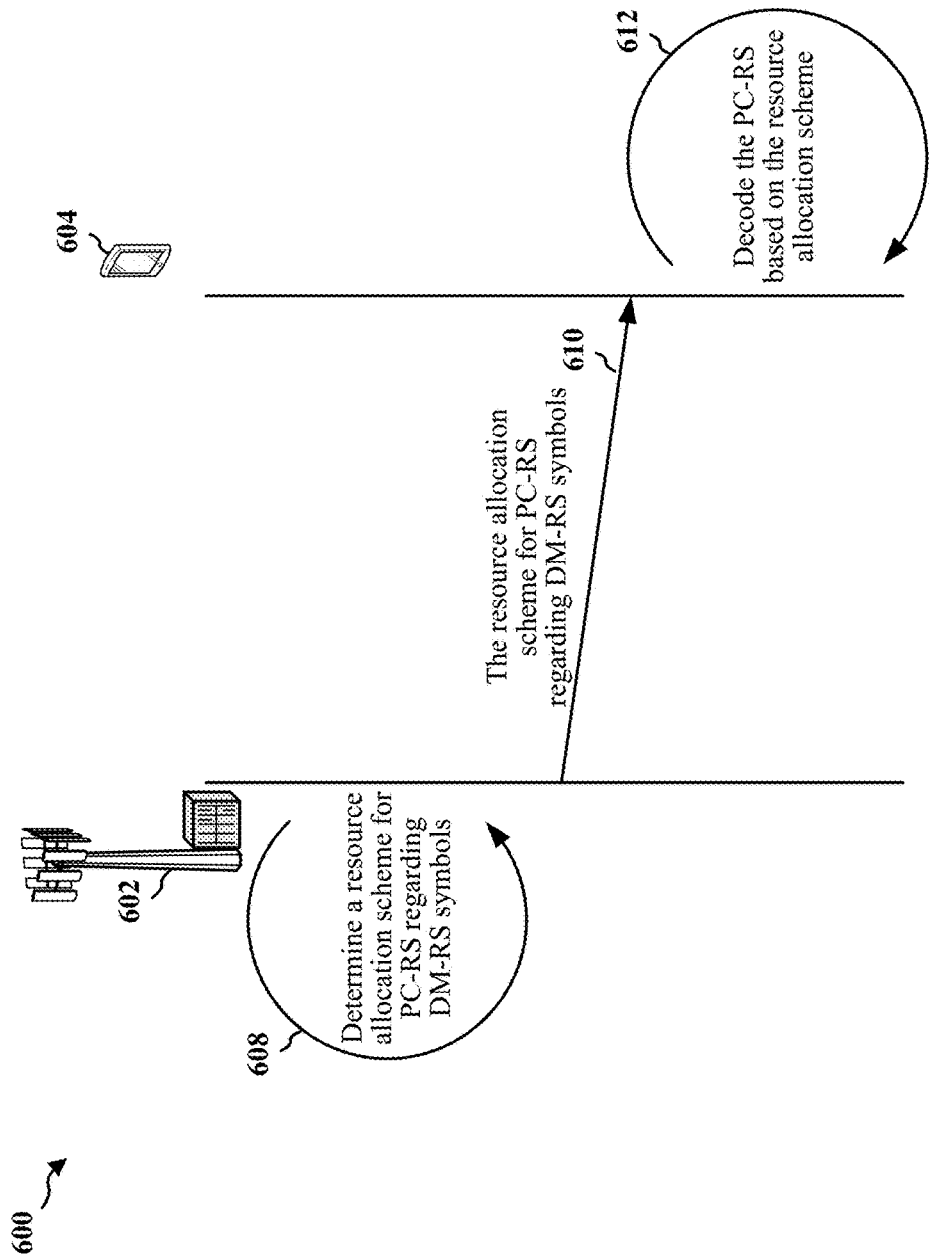
FIG. 6 is a diagram illustrating an example of dynamically conveying information of PC-RS in a wireless communication system.

FIG. 6 is a diagram illustrating an example of dynamically conveying information of PC-RS in a wireless communication system 600. In this example, the wireless communication system 600 includes a base station 602 and a UE 604. The base station 602 may determine (at 608) a resource allocation scheme for PC-RS in relation to DM-RS symbols in a subframe. The base station 602 may change the resource allocation scheme for PC-RS in relation to DM-RS symbols dynamically based on information obtained by the base station 602 at any particular moment.

Upon the determination of the resource allocation scheme for PC-RS in relation to DM-RS symbols within a subframe, the base station 602 may transmit (at 610) the determined resource allocation scheme to the UE 604. In one configuration, the determined resource allocation scheme for PC-RS in relation to DM-RS symbols in a subframe may be dynamically conveyed to the UE 604 via PDCCH of the same subframe. In one configuration, one or more bits may be reserved in DCI to convey the determined resource allocation scheme to the UE 604. For example and in one configuration, two bits may be reserved in DCI to indicate a particular pattern of resource allocation for PC-RS in relation to DM-RS symbols within a subframe. In another configuration, the determined resource allocation scheme for PC-RS in relation to DM-RS symbols in a subframe may be conveyed to the UE 604 via RRC signaling.

Once the UE 604 receives the determined resource allocation scheme from the base station 602, the UE 604 may decode (at 612) the PC-RS from the subframe based on the received resource allocation scheme for PC-RS in relation to DM-RS symbols within the subframe. As a result, the UE 604 may be dynamically informed of the base station's decision regarding the resource allocation scheme for PC-RS in relation to DM-RS symbols within a subframe, thus being able to decode the PC-RS accordingly.

FIG. 7A is a diagram 700 illustrating an example of resource allocation scheme for PC-RS with regard to DM-RS symbols within a subframe. In this example, a single DM-RS symbol 702 is placed at the beginning (e.g., the first symbol) of PDSCH. PC-RS may occupy one or more subcarriers. For example, PC-RS may occupy subcarrier 704. In one configuration, PC-RS may co-exist with the DM-RS symbol 702 within a subframe. In one configuration, PC-RS may be punctured by the DM-RS symbol 702, as well as by PDCCH. For example, PC-RS does not occupy resource elements that are assigned to the DM-RS symbol 702 and symbols within PDCCH. In one configuration, PC-RS and DM-RS may occupy different symbols of the subframe.

FIG. 7B is a diagram 750 illustrating another example of resource allocation scheme for PC-RS in relation to DM-RS symbols within a subframe. In this example, a first DM-RS symbol 752 may be placed at the beginning (e.g., the first symbol) of PDSCH, and a second DM-RS symbol 754 may be placed in the middle (e.g., the $7^{th}$ symbol) of PDSCH.

PC-RS may occupy one or more subcarriers. For example, PC-RS may occupy subcarrier 756. In one configuration, PC-RS may co-exist with the DM-RS symbols 752 and 754 within a subframe. In one configuration, PC-RS may be punctured by the DM-RS symbols 752 and 754, as well as by PDCCH. For example, PC-RS does not occupy resource elements that are assigned to the DM-RS symbols 752, 754, and symbols within PDCCH. In one configuration, PC-RS and DM-RS may occupy different symbols of the subframe.

FIG. 8A is a diagram 800 illustrating an example of resource allocation scheme for PC-RS with regard to DM-RS symbols within a subframe. In this example, a single DM-RS symbol 802 may be placed at the beginning (e.g., the first symbol) of PDSCH. PC-RS may occupy one or more subcarriers. For example, PC-RS may occupy subcarrier 804. In one configuration, PC-RS may co-exist with the DM-RS symbol 802 within a subframe. PC-RS may be punctured by PDCCH. In one configuration, the resource element at subcarrier 804 of the DM-RS symbol 802 may be punctured to accommodate PC-RS in the DM-RS symbol 802. For example, PC-RS may occupy resource element at subcarrier 804 of the DM-RS symbol 802.

FIG. 8B is a diagram 850 illustrating another example of resource allocation scheme for PC-RS with regard to DM-RS symbols within a subframe. In this example, a first DM-RS symbol 852 may be placed at the beginning (e.g., the first symbol) of PDSCH, and a second DM-RS symbol 854 may be placed in the middle (e.g., the $7^{th}$ symbol) of PDSCH. PC-RS may occupy one or more subcarriers. For example, PC-RS may occupy subcarrier 856. In one configuration, PC-RS may co-exist with the DM-RS symbols 852 and 854 within a subframe. PC-RS may be punctured by PDCCH. In one configuration, the resource elements at subcarrier 856 of the DM-RS symbols 852 and 854 may be punctured to accommodate PC-RS in the DM-RS symbols 852 and 854. For example, PC-RS may occupy resource elements at subcarrier 856 of the DM-RS symbols 852 and 854.

FIG. 9A is a diagram 900 illustrating an example of resource allocation scheme for PC-RS with regard to DM-RS symbols within a subframe. In this example, a single DM-RS symbol 902 may be placed at the beginning (e.g., the first symbol) of PDSCH. The DM-RS symbol 902 may be transmitted in one out of N subcarriers to reduce overhead. In the example in FIG. 9A, N is equal to 2. But one of ordinary skill in the art would recognize that this is for illustration purpose and N could be 2, 4, 8, or any other positive integer. PC-RS may occupy one or more subcarriers. For example, PC-RS may occupy subcarriers 904, 906, and 908. PC-RS may be transmitted in multiple subcarriers to estimate phase trajectory. In one configuration, PC-RS may co-exist with the DM-RS symbol 902 within a subframe. PC-RS may be punctured by PDCCH. In one configuration, PC-RS may be rate matched around subcarriers in the DM-RS symbol 902. For example, at the first symbol of PDSCH, PC-RS may occupy resource elements at subcarriers (e.g., 904 and 908) that are not used by the DM-RS symbol 902, but may not occupy resource element at subcarrier 906 that is used by the DM-RS symbol 902.

FIG. 9B is a diagram 950 illustrating another example of resource allocation scheme for PC-RS with regard to DM-RS symbols within a subframe. In this example, a first DM-RS symbol 952 may be placed at the beginning (e.g., the first symbol) of PDSCH, and a second DM-RS symbol 954 may be placed in the middle (e.g., the $7^{th}$ symbol) of PDSCH. The DM-RS symbols 952 and 954 may be transmitted in one out of N subcarriers to reduce overhead. In the example in FIG. 9B, N is equal to 2. But one of ordinary skill in the art would recognize that this is for illustration purpose and N could be 2, 4, 8, or any other positive integer. PC-RS may occupy one or more subcarriers. For example, PC-RS may occupy subcarriers 956, 958, and 960. PC-RS may be transmitted in multiple subcarriers to estimate phase trajectory. In one configuration, PC-RS may co-exist with the DM-RS symbols 952 and 954 within a subframe. PC-RS may be punctured by PDCCH. In one configuration, PC-RS may be rate matched around subcarriers in the DM-RS symbols 952 and 954. For example, at the first and $7^{th}$ symbols, PC-RS may occupy resource elements at subcarriers (e.g., 956 and 960) that are not used by the DM-RS symbols 952 and 954, but may not occupy resource elements at subcarrier 958 that are used by the DM-RS symbols 952 and 954.

Figures 10A, 10B:
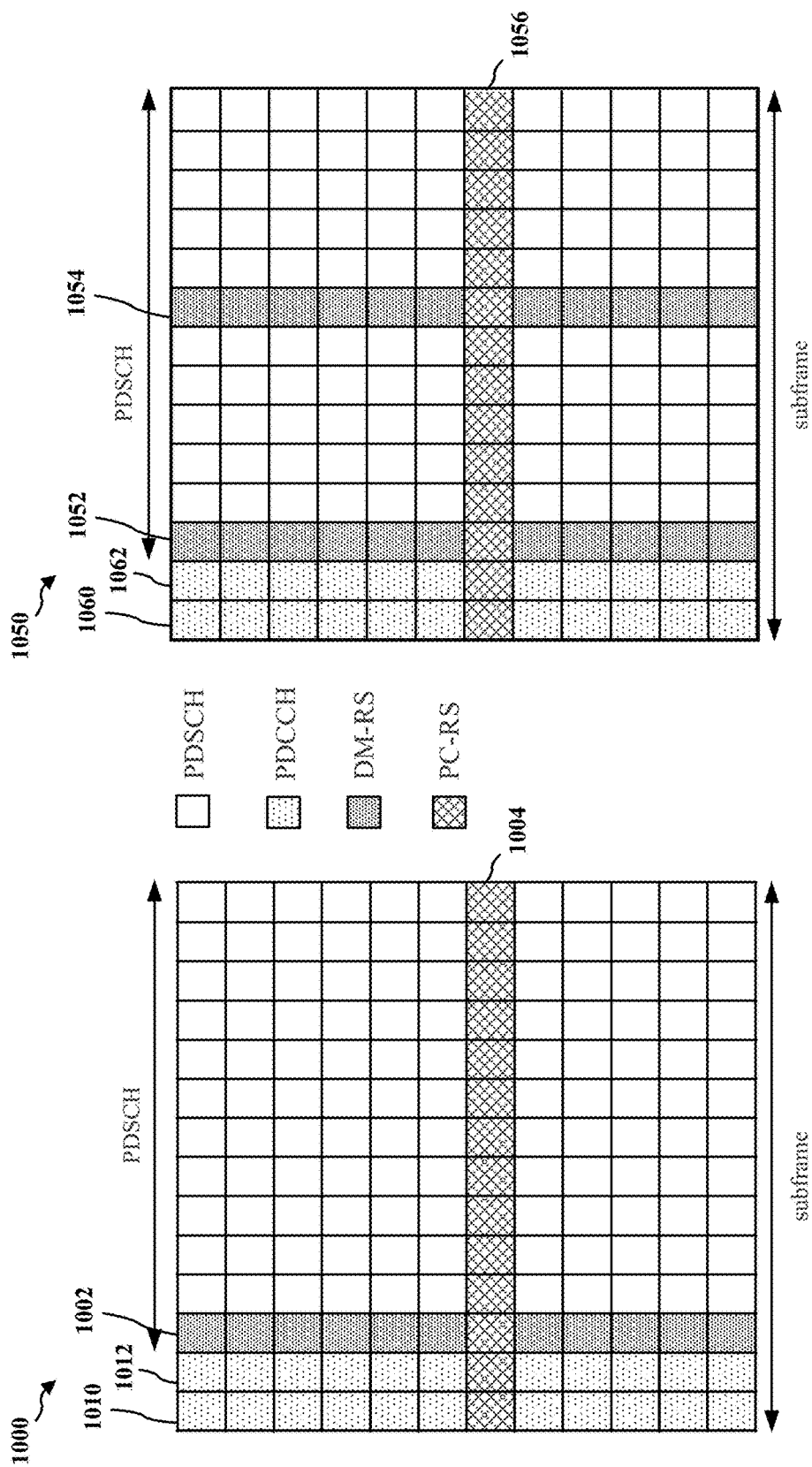
FIG. 10A is a diagram illustrating an example of resource allocation scheme for PC-RS with regard to PDCCH symbols within a subframe.
FIG. 10B is a diagram illustrating another example of resource allocation scheme for PC-RS with regard to PDCCH symbols within a subframe.

FIG. 10A is a diagram 1000 illustrating an example of resource allocation scheme for PC-RS with regard to PDCCH symbols within a subframe. In this example, there are two PDCCH symbols 1010 and 1012, and a single DM-RS symbol 1002 is placed at the beginning (e.g., the first symbol) of PDSCH. PC-RS may occupy one or more subcarriers. For example, PC-RS may occupy subcarrier 1004. In one configuration, PC-RS may co-exist with the DM-RS symbol 1002 within a subframe. In one configuration, the PDCCH symbols 1010 and 1012 may be punctured to accommodate PC-RS. For example, PC-RS may occupy resource elements at subcarrier 1004 of the PDCCH symbols 1010 and 1012.

FIG. 10B is a diagram 1050 illustrating another example of resource allocation scheme for PC-RS with regard to PDCCH symbols within a subframe. In this example, there are two PDCCH symbols 1060 and 1062, and a first DM-RS symbol 1052 is placed at the beginning (e.g., the first symbol) of PDSCH, and a second DM-RS symbol 1054 is placed in the middle (e.g., the $7^{th}$ symbol) of PDSCH. PC-RS may occupy one or more subcarriers. For example, PC-RS may occupy subcarrier 1056. In one configuration, PC-RS may co-exist with the DM-RS symbols 1052 and 1054 within a subframe. In one configuration, the PDCCH symbols 1060 and 1062 may be punctured to accommodate PC-RS. For example, PC-RS may occupy resource elements at subcarrier 1056 of the PDCCH symbols 1060 and 1062.

In one configuration, the base station 602 described above in FIG. 6 may switch between the different resource allocation schemes for PC-RS illustrated in FIGS. 7A, 7B, 8A, 8B, 9A, 9B, 10A, 10B based on information obtained by the base station 602 at any particular moment. In one configuration, the resource allocation schemes for PC-RS illustrated in FIG. 7A, 7B, 8A, 8B, 9A, 9B, 10A, 10B may be the resource allocation scheme for PC-RS conveyed from the base station 602 to the UE 604, as described above with reference to FIG. 6.

Figure 11:
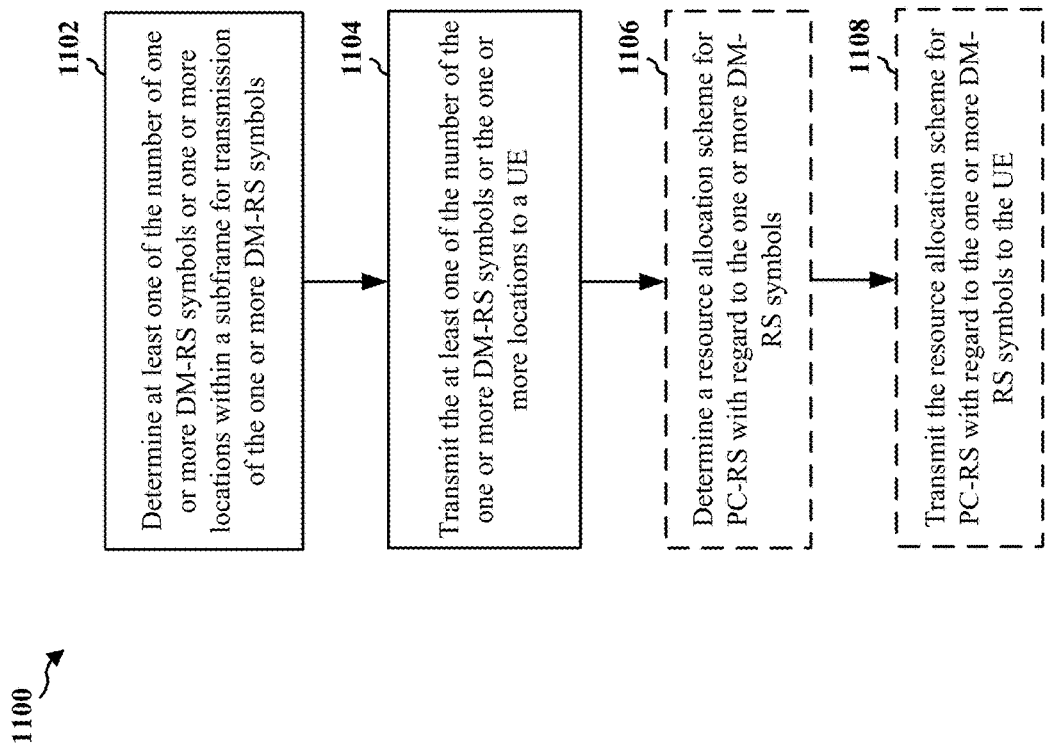
FIG. 11 is a flowchart of a method of wireless communication.

FIG. 11 is a flowchart 1100 of a method of wireless communication. The method may be performed by an eNB (e.g., the eNB 102, 310, 402, 602, or the apparatus 1202/1202'). At 1102, the eNB may determine at least one of the number of one or more DM-RS symbols in a subframe or one or more locations within the subframe for transmission of the one or more DM-RS symbols. In one configuration, the operations performed at 1102 may be the operations described above with reference to 408 of FIG. 4.

In one configuration, the number of the one or more DM-RS symbols may be one. In such a configuration, the one or more locations may include the first symbol of PDSCH/PUSCH. In one configuration, the number of the one or more DM-RS symbols may be two. In such a configuration, the one or more locations may include a first location at the beginning of PDSCH/PUSCH and a second location in the middle of PDSCH/PUSCH. The first location and the second location may be separated by at least one symbol. In one configuration, the one or more DM-RS symbols may be inserted in PDSCH/PUSCH for channel estimation.

At 1104, the eNB may transmit the at least one of the number of the one or more DM-RS symbols or the one or more locations within the subframe for the transmission of the one or more DM-RS symbols to a UE. In one configuration, the operations performed at 1104 may be the operations described above with reference to 410 of FIG. 4.

In one configuration, the at least one of the number of DM-RS symbols or the one or more locations for transmission of the DM-RS symbols may be dynamically transmitted to the UE via PDCCH. In such a configuration, one or more bits may be reserved in DCI to identify the at least one of the number of the DM-RS symbols or the one or more locations within the subframe for transmission of the DM-RS symbols. In one configuration, the at least one of the number or the locations of DM-RS symbols may be transmitted to the UE via RRC signaling.

At 1106, the eNB may optionally determine a resource allocation scheme for PC-RS with regard to the one or more DM-RS symbols co-existing in the same subframe. In one configuration, the operations performed at 1106 may be the operations described above with reference to 608 of FIG. 6. In one configuration, PDCCH may be punctured to accommodate PC-RS.

At 1108, the eNB may optionally transmit the resource allocation scheme for PC-RS with regard to the one or more DM-RS symbols to the UE. In one configuration, the operations performed at 1108 may be the operations described above with reference to 610 of FIG. 6.

In one configuration, the resource allocation scheme for the PC-RS with regard to the one or more DM-RS symbols may be transmitted to the UE dynamically via PDCCH. In such a configuration, one or more bits may be reserved in DCI to identify the resource allocation scheme for the PC-RS with regard to the one or more DM-RS symbols. In one configuration, the resource allocation scheme for the PC-RS with regard to the one or more DM-RS symbols may be transmitted to the UE via RRC signaling.

In one configuration, the resource allocation scheme (e.g., the resource allocation scheme described above in FIGS. 9A and 9B) may inform the UE to rate match the PC-RS around subcarriers of the one or more DM-RS symbols. In one configuration, the resource allocation scheme (e.g., the resource allocation scheme described above in FIGS. 8A and 8B) may inform the UE to puncture the one or more DM-RS symbols in subcarriers that are reserved for the PC-RS. In one configuration, the resource allocation scheme (e.g., the resource allocation scheme described above in FIGS. 7A and 7B) may inform the UE to puncture the PC-RS in the one or more DM-RS symbols.

Figure 12:
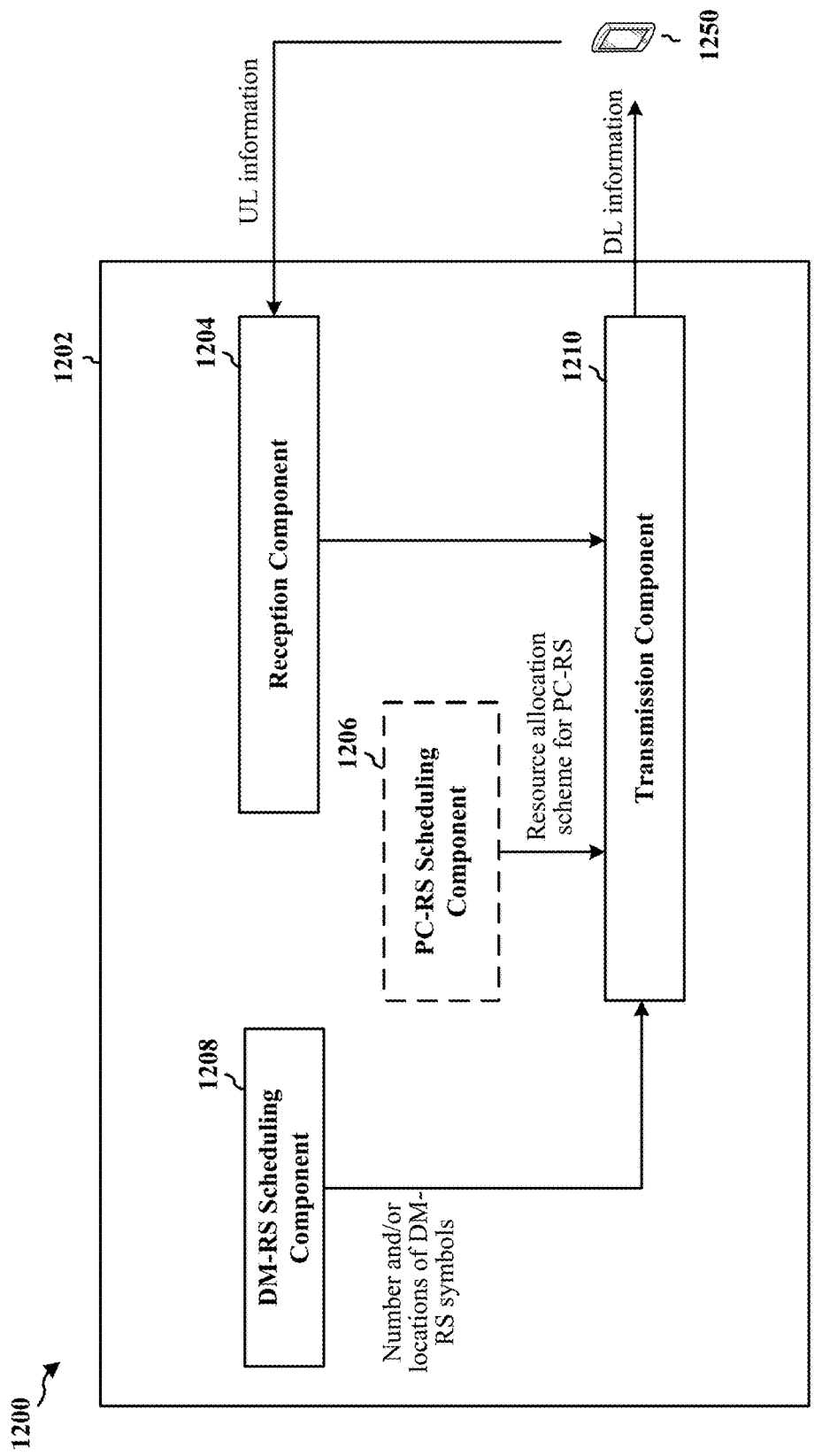
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus 1202 may be an eNB. The apparatus 1202 may include a reception component 1204 that receives uplink information from a UE 1250. The apparatus may include a transmission component 1210 that transmits downlink information to the UE 1250. The reception component 1204 and the transmission component 1210 may work together to coordinate communications of the apparatus 1202.

The apparatus 1202 may include a DM-RS scheduling component 1208 that determines the resource allocation scheme (e.g., at least one of the number or locations) for DM-RS symbols. In one configuration, the DM-RS scheduling component 1208 may perform operations described above with reference to 1102 of FIG. 11. The DM-RS scheduling component 1208 may send the determined at least one of number or locations of DM-RS symbols to the transmission component 1210 for conveyance to the UE 1250.

The apparatus 1202 may optionally include a PC-RS scheduling component 1206 that determines the resource allocation scheme for PC-RS. In one configuration, the PC-RS scheduling component 1206 may perform operations described above with reference to 1106 of FIG. 11. The PC-RS scheduling component 1206 may send the determined resource allocation scheme for PC-RS to the transmission component 1210 for conveyance to the UE 1250.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
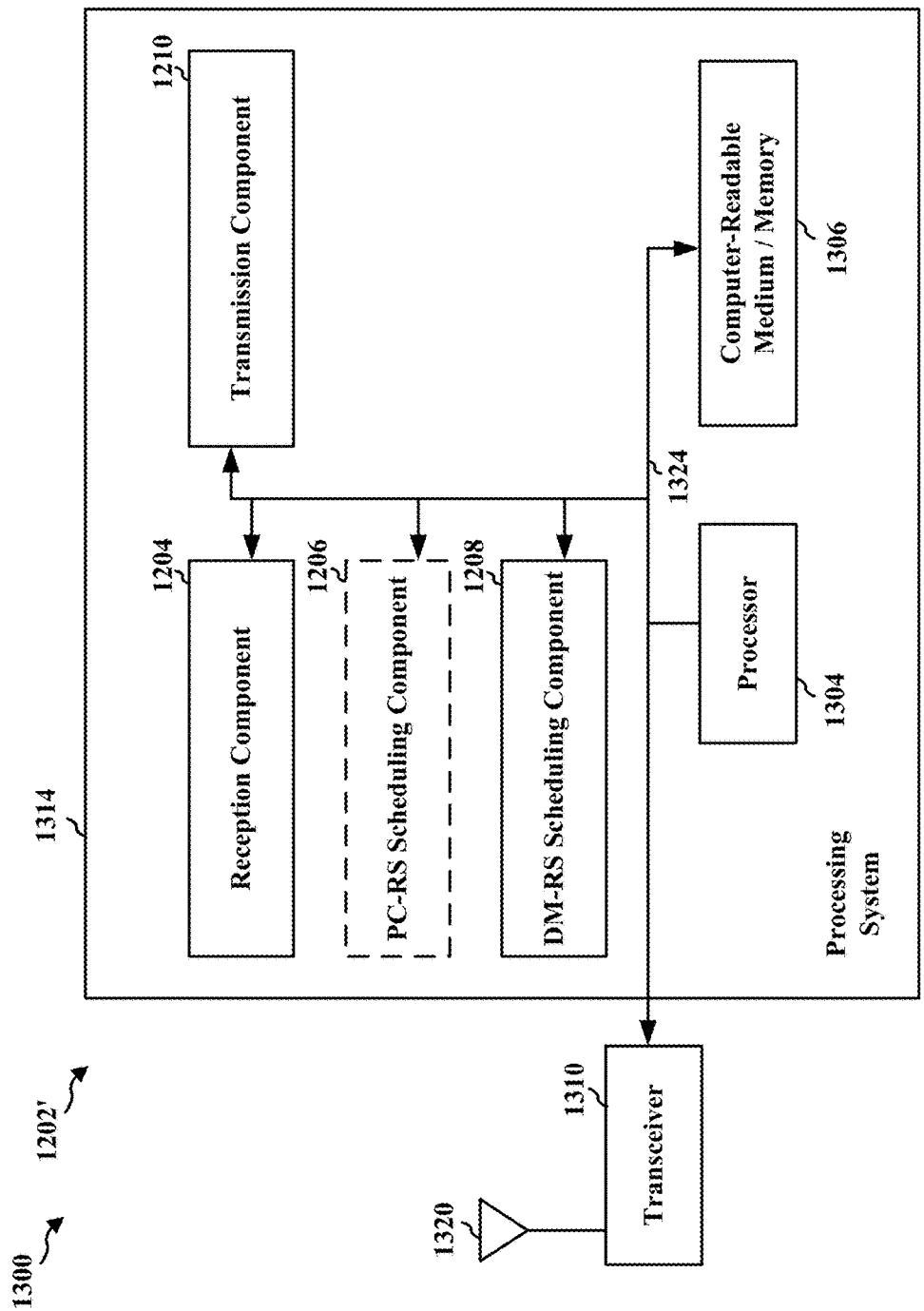
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the eNB 310 and may include the memory 376 and/or at least one of the TX processor 316, the RX processor 370, and the controller/processor 375.

In one configuration, the apparatus 1202/1202' for wireless communication may include means for determining at least one of the number of one or more DM-RS symbols or one or more locations within a subframe for transmission of the one or more DM-RS symbols. In one configuration, the means for determining at least one of the number of one or more DM-RS symbols or one or more locations within a subframe for transmission of the one or more DM-RS symbols may perform operations described above with reference to 1102 of FIG. 11. In one configuration, the means for determining at least one of the number of one or more DM-RS symbols or one or more locations within a subframe for transmission of the one or more DM-RS symbols may be the DM-RS scheduling component 1208 or the processor 1304.

In one configuration, the apparatus 1202/1202' may include means for transmitting the at least one of the number of the one or more DM-RS symbols or the one or more locations within the subframe for the transmission of the one or more DM-RS symbols to a UE. In one configuration, the means for transmitting the at least one of the number of the one or more DM-RS symbols or the one or more locations within the subframe for the transmission of the one or more DM-RS symbols to a UE may perform operations described above with reference to 1104 of FIG. 11. In one configuration, the means for transmitting the at least one of the number of the one or more DM-RS symbols or the one or more locations within the subframe for the transmission of the one or more DM-RS symbols to a UE may be the one or more antennas 1320, the transceiver 1310, the transmission component 1210, or the processor 1304.

In one configuration, the means for transmitting the at least one of the number or the locations of DM-RS symbols to the UE may be configured to send the at least one of the number or the locations of DM-RS symbols to the UE dynamically via PDCCH. In one configuration, the means for transmitting the at least one of the number or the locations of DM-RS symbols to the UE may be configured to send the at least one of the number or the locations of DM-RS symbols to the UE via RRC signaling.

In one configuration, the apparatus 1202/1202' may include means for determining a resource allocation scheme for PC-RS. In one configuration, the means for determining a resource allocation scheme for PC-RS may perform operations described above with reference to 1106 of FIG. 11. In one configuration, the means for determining a resource allocation scheme for PC-RS may be the PC-RS scheduling component 1206 or the processor 1304.

In one configuration, the apparatus 1202/1202' may include means for transmitting the resource allocation scheme for the PC-RS to the UE. In one configuration, the means for transmitting the resource allocation scheme for the PC-RS to the UE may perform operations described above with reference to 1108 of FIG. 11. In one configuration, the means for transmitting the resource allocation scheme for the PC-RS to the UE may be the one or more antennas 1320, the transceiver 1310, the transmission component 1210, or the processor 1304.

In one configuration, the means for transmitting the resource allocation scheme for the PC-RS to the UE may be configured to send the resource allocation scheme for the PC-RS to the UE dynamically via PDCCH. In one configuration, the means for transmitting the resource allocation scheme for the PC-RS to the UE may be configured to send the resource allocation scheme for the PC-RS to the UE via RRC signaling.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
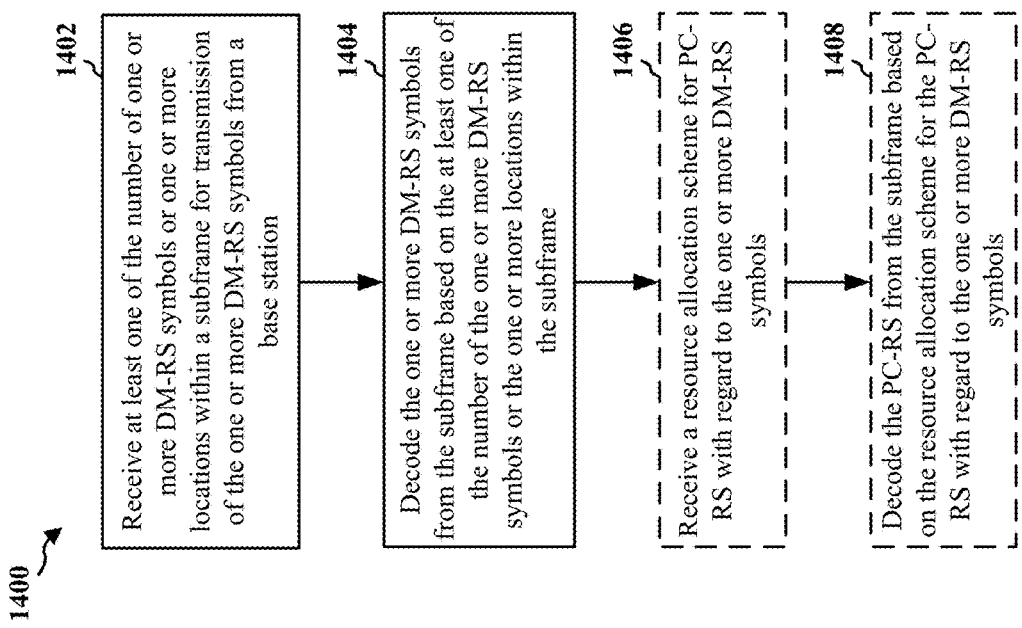
FIG. 14 is a flowchart of a method of wireless communication.

FIG. 14 is a flowchart 1400 of a method of wireless communication. The method may be performed by a UE (e.g., the UE 104, 350, 406, 604, or the apparatus 1502/1502'). At 1402, the UE may receive at least one of the number of one or more DM-RS symbols or one or more locations within a subframe for transmission of the one or more DM-RS symbols from a base station. In one configuration, the operations performed at 1402 may be the operations described above with reference to 410 of FIG. 4.

In one configuration, the number of the one or more DM-RS symbols may be one. In such a configuration, the one or more locations may include the first symbol of PDSCH or PUSCH. In one configuration, the number of the one or more DM-RS symbols may be two. In such a configuration, the one or more locations may include a first location at the beginning of PDSCH/PUSCH and a second location in the middle of PDSCH/PUSCH. The first location and the second location may be separated by at least one symbol. In one configuration, the one or more DM-RS symbols may be inserted in PDSCH/PUSCH for channel estimation.

In one configuration, the at least one of the number or the locations of DM-RS symbols may be dynamically received via PDCCH. In such a configuration, one or more bits may be reserved in DCI to identify the at least one of the number of the one or more DM-RS symbols or the one or more locations within the subframe for the transmission of the one or more DM-RS symbols. In one configuration, the at least one of the number or the locations of DM-RS symbols may be received via RRC signaling.

At 1404, the UE may decode the one or more DM-RS symbols from the subframe based on the at least one of the number or the one or more locations within the subframe. In one configuration, the operations performed at 1404 may be the operations described above with reference to 412 of FIG. 4.

At 1406, the UE may optionally receive a resource allocation scheme for PC-RS with regard to the one or more DM-RS symbols. In one configuration, the operations performed at 1406 may be the operations described above with reference to 610 of FIG. 6. In one configuration, PDCCH may be punctured to accommodate PC-RS.

In one configuration, the resource allocation scheme for the PC-RS with regard to the one or more DM-RS symbols may be received dynamically via PDCCH. In such a configuration, one or more bits may be reserved in DCI to identify the resource allocation scheme for the PC-RS with regard to the one or more DM-RS symbols. In one configuration, the resource allocation scheme for the PC-RS with regard to the one or more DM-RS symbols may be received via RRC signaling.

In one configuration, the resource allocation scheme (e.g., the resource allocation scheme described above in FIGS. 9A and 9B) may inform the UE to rate match the PC-RS around subcarriers of the one or more DM-RS symbols. In one configuration, the resource allocation scheme (e.g., the resource allocation scheme described above in FIGS. 8A and 8B) may inform the UE to puncture the one or more DM-RS symbols in subcarriers that are reserved for the PC-RS. In one configuration, the resource allocation scheme (e.g., the resource allocation scheme described above in FIGS. 7A and 7B) may inform the UE to puncture the PC-RS in the one or more DM-RS symbols.

At 1408, the UE may optionally decode the PC-RS from the subframe based on the resource allocation scheme for the PC-RS with regard to the one or more DM-RS symbols. In one configuration, the operations performed at 1408 may be the operations described above with reference to 612 of FIG. 6.

Figure 15:
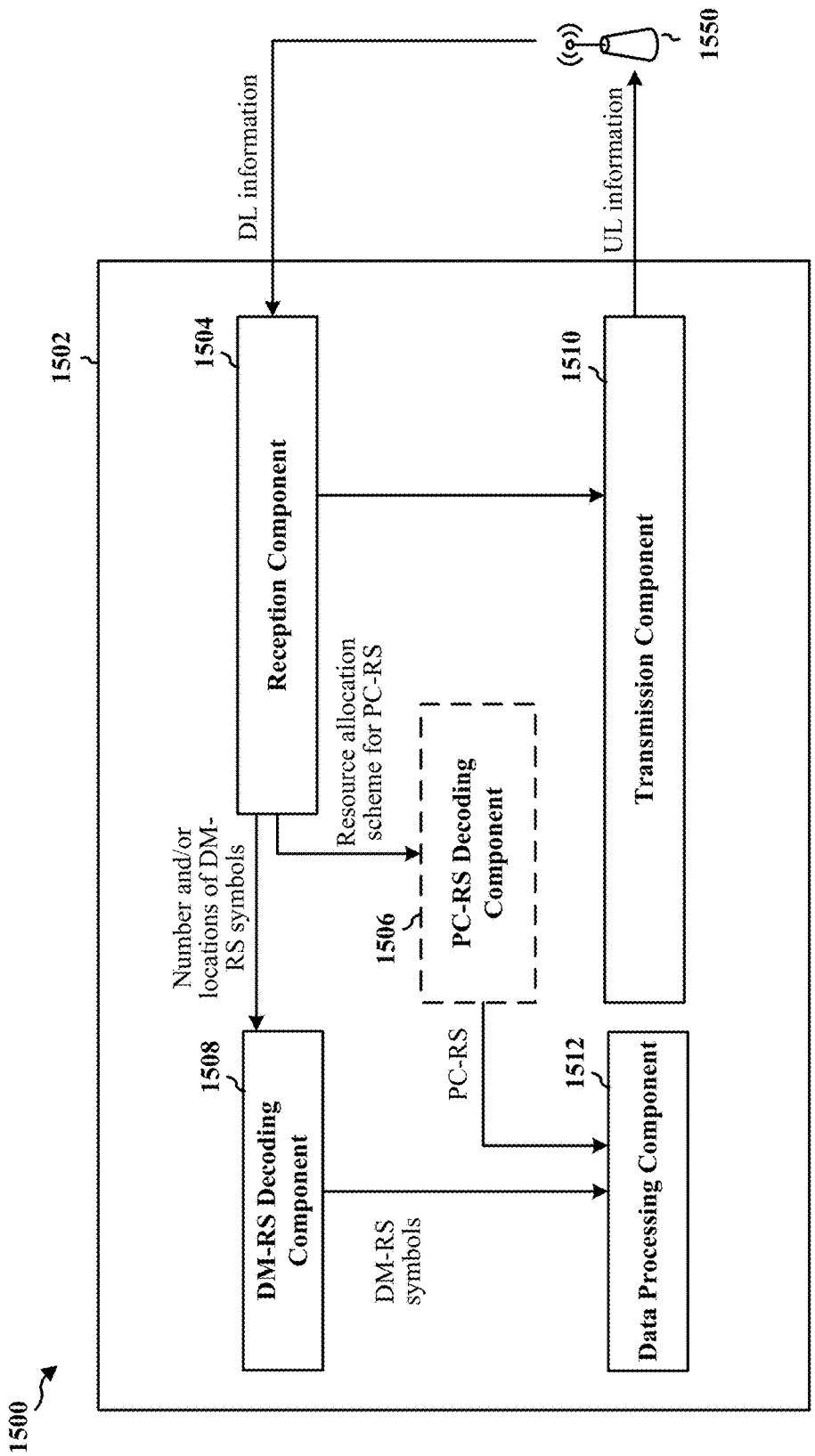
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus 1502 may be a UE. The apparatus 1502 may include a reception component 1504 that receives downlink information from a base station 1550. The apparatus 1502 may include a transmission component 1510 that transmits uplink information to the base station 1550. The reception component 1504 and the transmission component 1510 may work together to coordinate communications of the apparatus 1502.

The apparatus 1502 may include a DM-RS decoding component 1508 that decodes DM-RS symbols from a subframe based on the at least one of the number or locations of DM-RS symbols received from the reception component 1504. In one configuration, the DM-RS decoding component 1508 may perform operations described above with reference to 1404 of FIG. 14.

The apparatus 1502 may optionally include a PC-RS decoding component 1506 that decodes PC-RS from a subframe based on the resource allocation scheme for PC-RS received from the reception component 1504. In one configuration, the PC-RS decoding component 1506 may perform operations described above with reference to 1408 of FIG. 14.

The apparatus 1502 may include a data processing component 1512 that processes data (e.g., decoding data from the subframe). In one configuration, the data processing component 1512 may process data based on DM-RS symbols received from the DM-RS decoding component 1508 and/or PC-RS received from the PC-RS decoding component 1506.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
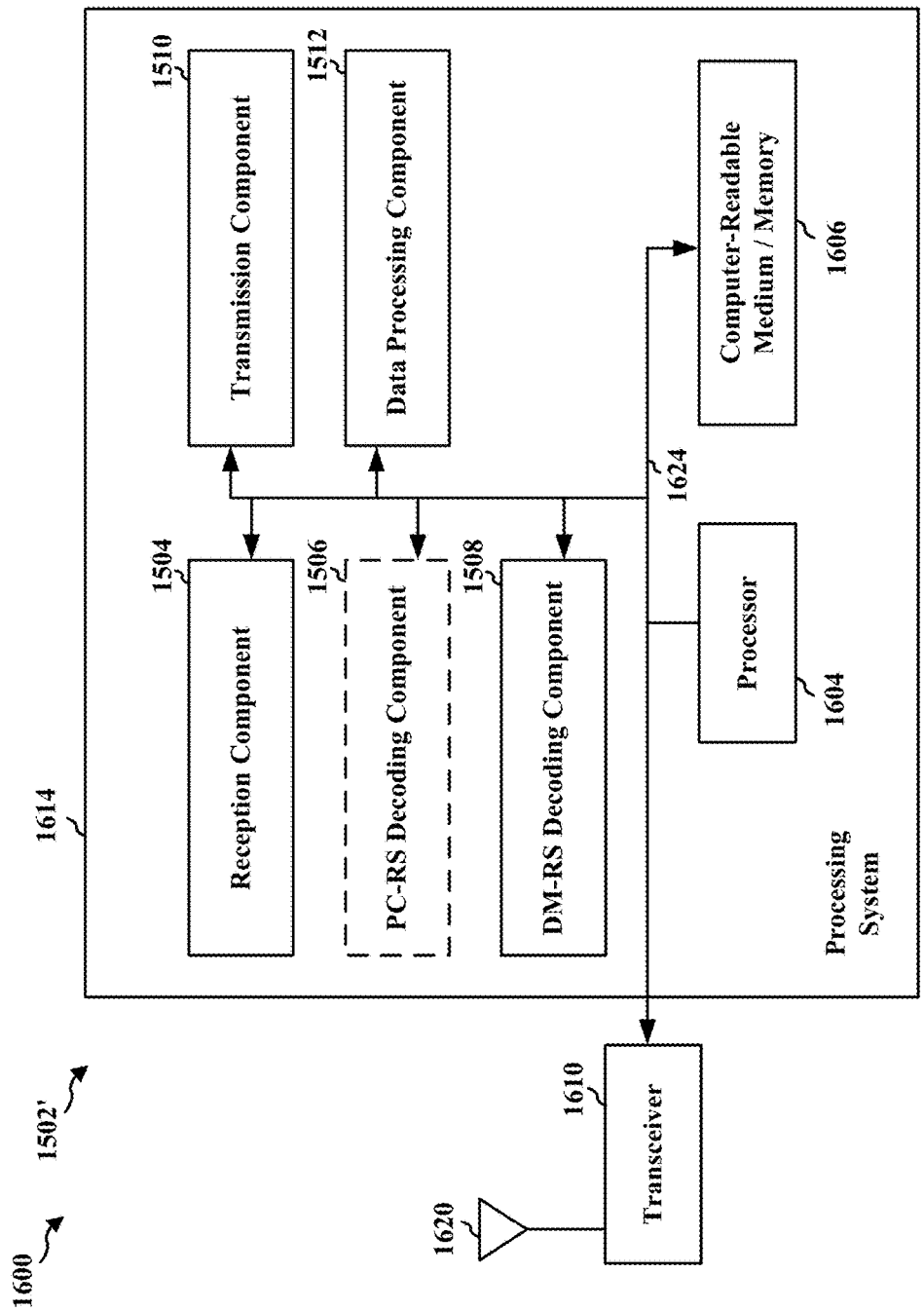
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512 and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication may include means for receiving at least one of a number of one or more DM-RS symbols or one or more locations within a subframe for transmission of the one or more DM-RS symbols from a base station. In one configuration, the means for receiving at least one of a number of one or more DM-RS symbols or one or more locations within a subframe for transmission of the one or more DM-RS symbols from a base station may perform operations described above with reference to 1402 of FIG. 14. In one configuration, the means for receiving at least one of a number of one or more DM-RS symbols or one or more locations within a subframe for transmission of the one or more DM-RS symbols from a base station may be the one or more antennas 1620, the transceiver 1610, the reception component 1504, or the processor 1604.

In one configuration, the means for receiving the at least one of the number or the locations of DM-RS symbols may be configured to receive the at least one of the number or the one or more locations dynamically via PDCCH. In one configuration, the means for receiving the at least one of the number or the locations of DM-RS symbols may be configured to receive the at least one of the number or the locations of DM-RS symbols via RRC signaling.

In one configuration, the apparatus 1502/1502' may include means for decoding the one or more DM-RS symbols from the subframe based on the at least one of the number or the locations of DM-RS symbols. In one configuration, the means for decoding the one or more DM-RS symbols from the subframe based on the at least one of the number or the locations of DM-RS symbols may perform operations described above with reference to 1404 of FIG. 14. In one configuration, the means for decoding the one or more DM-RS symbols from the subframe based on the at least one of the number or the locations of DM-RS symbols may be the DM-RS decoding component 1508 or the processor 1604.

In one configuration, the apparatus 1502/1502' may include means for receiving a resource allocation scheme for a PC-RS. In one configuration, the means for receiving a resource allocation scheme for a PC-RS may perform operations described above with reference to 1406 of FIG. 14. In one configuration, the means for receiving a resource allocation scheme for a PC-RS may be the one or more antennas 1620, the transceiver 1610, the reception component 1504, or the processor 1604.

In one configuration, the means for receiving the resource allocation scheme for the PC-RS may be configured to receive the resource allocation scheme for the PC-RS dynamically via PDCCH. In one configuration, the means for receiving the resource allocation scheme for the PC-RS may be configured to receive the resource allocation scheme for the PC-RS via RRC signaling.

In one configuration, the apparatus 1502/1502' may include means for decoding the PC-RS from the subframe based on the resource allocation scheme for the PC-RS. In one configuration, the means for decoding the PC-RS from the subframe based on the resource allocation scheme for the PC-RS may perform operations described above with reference to 1408 of FIG. 14. In one configuration, the means for decoding the PC-RS from the subframe based on the resource allocation scheme for the PC-RS may be the PC-RS decoding component 1506 or the processor 1604.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
    determining at least one of a number of one or more demodulation reference signal (DM-RS) symbols or one or more locations within a subframe for transmission of the one or more DM-RS symbols;
    transmitting the at least one of the number of the one or more DM-RS symbols or the one or more locations within the subframe for the transmission of the one or more DM-RS symbols to a user equipment (UE);
    determining a resource allocation scheme for a phase noise compensation reference signal (PC-RS) in relation to the one or more DM-RS symbols in the subframe, wherein the PC-RS is conveyed from the base station to the UE for the UE to estimate a phase noise of the UE; and
    transmitting the resource allocation scheme for the PC-RS to the UE.

2. The method of claim 1, wherein the transmitting of the resource allocation scheme for the PC-RS to the UE comprises sending the resource allocation scheme for the PC-RS to the UE dynamically via physical downlink control channel (PDCCH).

3. The method of claim 2, wherein one or more bits are reserved in downlink control information (DCI) to identify the resource allocation scheme for the PC-RS.

4. The method of claim 1, wherein the transmitting of the resource allocation scheme for the PC-RS to the UE comprises sending the resource allocation scheme for the PC-RS to the UE via radio resource control (RRC) signaling.

5. The method of claim 1, wherein the resource allocation scheme informs the UE to rate match the PC-RS around subcarriers of the one or more DM-RS symbols.

6. The method of claim 1, wherein the resource allocation scheme informs the UE to puncture the one or more DM-RS symbols in subcarriers that are reserved for the PC-RS.

7. The method of claim 1, wherein the resource allocation scheme informs the UE to puncture the PC-RS in the one or more DM-RS symbols.

8. A method of wireless communication of a base station, comprising:
   determining information to be conveyed by a physical downlink control channel (PDCCH);
   allocating a phase noise compensation reference signal (PC-RS) in relation to one or more demodulation reference signal (DM-RS) symbols; and
   transmitting the information to a user equipment (UE) via the PDCCH, wherein the PDCCH is punctured to accommodate the PC-RS conveyed from the base station to the UE for the UE to estimate a phase noise of the UE.

9. The method of claim 8, wherein the information comprises at least one of a number of the one or more DM-RS symbols or one or more locations within a subframe for transmission of the one or more DM-RS symbols.

10. The method of claim 9, wherein one or more bits are reserved in downlink control information (DCI) to identify the at least one of the number of the one or more DM-RS symbols or the one or more locations within the subframe for the transmission of the one or more DM-RS symbols.

11. The method of claim 9, wherein the number of the one or more DM-RS symbols is one, wherein the one or more locations comprise a first symbol of physical downlink shared channel (PDSCH).

12. The method of claim 9, wherein the number of the one or more DM-RS symbols is two, wherein the one or more locations comprise a first location at a beginning of physical downlink shared channel (PDSCH) and a second location in a middle of the PDSCH, the first location and the second location being separated by at least one symbol.

13. A method of wireless communication of a user equipment (UE), comprising:
   receiving at least one of a number of one or more demodulation reference signal (DM-RS) symbols or one or more locations within a subframe for transmission of the one or more DM-RS symbols from a base station;
   decoding the one or more DM-RS symbols from the subframe based on the at least one of the number of the one or more DM-RS symbols or the one or more locations;
   receiving a resource allocation scheme for a phase noise compensation reference signal (PC-RS); and
   decoding the PC-RS from the subframe based on the resource allocation scheme for the PC-RS.

14. The method of claim 13, wherein the resource allocation scheme for the PC-RS is determined with regard to the one or more DM-RS symbols.

15. The method of claim 13, wherein the receiving of the resource allocation scheme for the PC-RS comprises receiving the resource allocation scheme for the PC-RS dynamically via physical downlink control channel (PDCCH).

16. The method of claim 15, wherein one or more bits are reserved in downlink control information (DCI) to identify the resource allocation scheme for the PC-RS.

17. The method of claim 13, wherein the receiving of the resource allocation scheme for the PC-RS comprises receiving the resource allocation scheme for the PC-RS via radio resource control (RRC) signaling.

18. The method of claim 13, wherein the resource allocation scheme informs the UE to rate match the PC-RS around subcarriers of the one or more DM-RS symbols.

19. The method of claim 13, wherein the resource allocation scheme informs the UE to puncture the one or more DM-RS symbols in subcarriers that are reserved for the PC-RS.

20. The method of claim 13, wherein the resource allocation scheme informs the UE to puncture the PC-RS in the one or more DM-RS symbols.

21. A method of wireless communication of a user equipment (UE), comprising:
   receiving a first information via a physical downlink control channel (PDCCH) from a base station, wherein the PDCCH is punctured to accommodate a phase noise compensation reference signal (PC-RS) conveyed from the base station to the UE for the UE to estimate a phase noise of the UE, wherein the first information comprises at least one of a number of one or more demodulation reference signal (DM-RS) symbols or one or more locations within a subframe for transmission of the one or more DM-RS symbols from the base station; and
   decoding the one or more DM-RS symbols from the subframe based on the at least one of the number of the one or more DM-RS symbols or the one or more locations.

22. The method of claim 21, wherein one or more bits are reserved in downlink control information (DCI) to identify the at least one of the number of the one or more DM-RS symbols or the one or more locations within the subframe for the transmission of the one or more DM-RS symbols.

23. The method of claim 21, wherein the number of the one or more DM-RS symbols is one, wherein the one or more locations comprise a first symbol of physical downlink shared channel (PDSCH).

24. The method of claim 21, wherein the number of the one or more DM-RS symbols is two, wherein the one or more locations comprise a first location at a beginning of physical downlink shared channel (PDSCH) and a second location in a middle of the PDSCH, the first location and the second location being separated by at least one symbol.

25. An apparatus for wireless communication, the apparatus being a base station, comprising:
   means for determining at least one of a number of one or more demodulation reference signal (DM-RS) symbols or one or more locations within a subframe for transmission of the one or more DM-RS symbols;
   means for transmitting the at least one of the number of the one or more DM-RS symbols or the one or more locations within the subframe for the transmission of the one or more DM-RS symbols to a user equipment (UE);
   means for determining a resource allocation scheme for a phase noise compensation reference signal (PC-RS) in relation to the one or more DM-RS symbols in the subframe, wherein the PC-RS is conveyed from the base station to the UE for the UE to estimate a phase noise of the UE; and
   means for transmitting the resource allocation scheme for the PC-RS to the UE.

26. The apparatus of claim 25, wherein the means for transmitting the resource allocation scheme for the PC-RS to the UE is configured to send the resource allocation scheme for the PC-RS to the UE dynamically via physical downlink control channel (PDCCH).

27. The apparatus of claim 26, wherein one or more bits are reserved in downlink control information (DCI) to identify the resource allocation scheme for the PC-RS.

28. The apparatus of claim 25, wherein the means for transmitting the resource allocation scheme for the PC-RS to the UE is configured to send the resource allocation scheme for the PC-RS to the UE via radio resource control (RRC) signaling.

29. The apparatus of claim 25, wherein the resource allocation scheme informs the UE to rate match the PC-RS around subcarriers of the one or more DM-RS symbols.

30. The apparatus of claim 25, wherein the resource allocation scheme informs the UE to puncture the one or more DM-RS symbols in subcarriers that are reserved for the PC-RS.

31. The apparatus of claim 25, wherein the resource allocation scheme informs the UE to puncture the PC-RS in the one or more DM-RS symbols.

32. An apparatus for wireless communication, the apparatus being a base station, comprising:
   means for determining information to be conveyed by a physical downlink control channel (PDCCH);
   means for allocating a phase noise compensation reference signal (PC-RS) in relation to one or more demodulation reference signal (DM-RS) symbols; and
   means for transmitting the information to a user equipment (UE) via the PDCCH, wherein the PDCCH is punctured to accommodate the PC-RS conveyed from the base station to the UE for the UE to estimate a phase noise of the UE.

33. The apparatus of claim 32, wherein the information comprises at least one of a number of the one or more DM-RS symbols or one or more locations within a subframe for transmission of the one or more DM-RS symbols.

34. The apparatus of claim 33, wherein one or more bits are reserved in downlink control information (DCI) to identify the at least one of the number of the one or more DM-RS symbols or the one or more locations within the subframe for the transmission of the one or more DM-RS symbols.

35. The apparatus of claim 33, wherein the number of the one or more DM-RS symbols is one, wherein the one or more locations comprise a first symbol of physical downlink shared channel (PDSCH).

36. The apparatus of claim 33, wherein the number of the one or more DM-RS symbols is two, wherein the one or more locations comprise a first location at a beginning of physical downlink shared channel (PDSCH) and a second location in a middle of the PDSCH, the first location and the second location being separated by at least one symbol.

37. An apparatus for wireless communication, the apparatus being a user equipment (UE), comprising:
   means for receiving at least one of a number of one or more demodulation reference signal (DM-RS) symbols or one or more locations within a subframe for transmission of the one or more DM-RS symbols from a base station;
   means for decoding the one or more DM-RS symbols from the subframe based on the at least one of the number of the one or more DM-RS symbols or the one or more locations;
   means for receiving a resource allocation scheme for a phase noise compensation reference signal (PC-RS); and
   means for decoding the PC-RS from the subframe based on the resource allocation scheme for the PC-RS.

38. The apparatus of claim 37, wherein the resource allocation scheme for the PC-RS is determined with regard to the one or more DM-RS symbols.

39. The apparatus of claim 37, wherein the means for receiving the resource allocation scheme for the PC-RS is configured to receive the resource allocation scheme for the PC-RS dynamically via physical downlink control channel (PDCCH).

40. The apparatus of claim 39, wherein one or more bits are reserved in downlink control information (DCI) to identify the resource allocation scheme for the PC-RS.

41. The apparatus of claim 37, wherein the means for receiving the resource allocation scheme for the PC-RS is configured to receive the resource allocation scheme for the PC-RS via radio resource control (RRC) signaling.

42. The apparatus of claim 37, wherein the resource allocation scheme informs the UE to rate match the PC-RS around subcarriers of the one or more DM-RS symbols.

43. The apparatus of claim 37, wherein the resource allocation scheme informs the UE to puncture the one or more DM-RS symbols in subcarriers that are reserved for the PC-RS.

44. The apparatus of claim 37, wherein the resource allocation scheme informs the UE to puncture the PC-RS in the one or more DM-RS symbols.

45. An apparatus for wireless communication, the apparatus being a user equipment (UE), comprising:
   means for receiving a first information via a physical downlink control channel (PDCCH) from a base station, wherein the PDCCH is punctured to accommodate a phase noise compensation reference signal (PC-RS) conveyed from the base station to the UE for the UE to estimate a phase noise of the UE, wherein the first information comprises at least one of a number of one or more demodulation reference signal (DM-RS) symbols or one or more locations within a subframe for transmission of the one or more DM-RS symbols from the base station; and
   decoding the one or more DM-RS symbols from the subframe based on the at least one of the number of the one or more DM-RS symbols or the one or more locations.

46. The apparatus of claim 45, wherein one or more bits are reserved in downlink control information (DCI) to identify the at least one of the number of the one or more DM-RS symbols or the one or more locations within the subframe for the transmission of the one or more DM-RS symbols.

47. The apparatus of claim 45, wherein the number of the one or more DM-RS symbols is one, wherein the one or more locations comprise a first symbol of physical downlink shared channel (PDSCH).

48. The apparatus of claim 45, wherein the number of the one or more DM-RS symbols is two, wherein the one or more locations comprise a first location at a beginning of physical downlink shared channel (PDSCH) and a second location in a middle of the PDSCH, the first location and the second location being separated by at least one symbol.

49. An apparatus for wireless communication, the apparatus being a base station, comprising:
   a memory; and
   at least one processor coupled to the memory and configured to:
      determine at least one of a number of one or more demodulation reference signal (DM-RS) symbols or one or more locations within a subframe for transmission of the one or more DM-RS symbols;

transmit the at least one of the number of the one or more DM-RS symbols or the one or more locations within the subframe for the transmission of the one or more DM-RS symbols to a user equipment (UE);

determine a resource allocation scheme for a phase noise compensation reference signal (PC-RS) in relation to the one or more DM-RS symbols in the subframe, wherein the PC-RS is conveyed from the base station to the UE for the UE to estimate a phase noise of the UE; and transmit the resource allocation scheme for the PC-RS to the UE.

50. The apparatus of claim 49, wherein, to transmit the resource allocation scheme for the PC-RS to the UE, the at least one processor is configured to send the resource allocation scheme for the PC-RS to the UE dynamically via physical downlink control channel (PDCCH).

51. The apparatus of claim 50, wherein one or more bits are reserved in downlink control information (DCI) to identify the resource allocation scheme for the PC-RS.

52. The apparatus of claim 49, wherein, to transmit the resource allocation scheme for the PC-RS to the UE, the at least one processor is configured to send the resource allocation scheme for the PC-RS to the UE via radio resource control (RRC) signaling.

53. The apparatus of claim 49, wherein the resource allocation scheme informs the UE to rate match the PC-RS around subcarriers of the one or more DM-RS symbols.

54. The apparatus of claim 49, wherein the resource allocation scheme informs the UE to puncture the one or more DM-RS symbols in subcarriers that are reserved for the PC-RS.

55. The apparatus of claim 49, wherein the resource allocation scheme informs the UE to puncture the PC-RS in the one or more DM-RS symbols.

56. An apparatus for wireless communication, the apparatus being a base station, comprising:
a memory; and
at least one processor coupled to the memory and configured to:
determine information to be conveyed by a physical downlink control channel (PDCCH);
allocate a phase noise compensation reference signal (PC-RS) in relation to one or more demodulation reference signal (DM-RS) symbols; and
transmit the information to a user equipment (UE) via the PDCCH, wherein the PDCCH is punctured to accommodate the PC-RS conveyed from the base station to the UE for the UE to estimate a phase noise of the UE.

57. The apparatus of claim 56, wherein the information comprises at least one of a number of the one or more DM-RS symbols or one or more locations within a subframe for transmission of the one or more DM-RS symbols.

58. The apparatus of claim 57, wherein one or more bits are reserved in downlink control information (DCI) to identify the at least one of the number of the one or more DM-RS symbols or the one or more locations within the subframe for the transmission of the one or more DM-RS symbols.

59. The apparatus of claim 57, wherein the number of the one or more DM-RS symbols is one, wherein the one or more locations comprise a first symbol of physical downlink shared channel (PDSCH).

60. The apparatus of claim 57, wherein the number of the one or more DM-RS symbols is two, wherein the one or more locations comprise a first location at a beginning of physical downlink shared channel (PDSCH) and a second location in a middle of the PDSCH, the first location and the second location being separated by at least one symbol.

61. An apparatus for wireless communication, the apparatus being a user equipment (UE), comprising:
a memory; and
at least one processor coupled to the memory and configured to:
receive at least one of a number of one or more demodulation reference signal (DM-RS) symbols or one or more locations within a subframe for transmission of the one or more DM-RS symbols from a base station;
decode the one or more DM-RS symbols from the subframe based on the at least one of the number of the one or more DM-RS symbols or the one or more locations;
receive a resource allocation scheme for a phase noise compensation reference signal (PC-RS); and
decode the PC-RS from the subframe based on the resource allocation scheme for the PC-RS.

62. The apparatus of claim 61, wherein the resource allocation scheme for the PC-RS is determined with regard to the one or more DM-RS symbols.

63. The apparatus of claim 61, wherein, to receive the resource allocation scheme for the PC-RS, the at least one processor is configured to receive the resource allocation scheme for the PC-RS dynamically via physical downlink control channel (PDCCH).

64. The apparatus of claim 63, wherein one or more bits are reserved in downlink control information (DCI) to identify the resource allocation scheme for the PC-RS.

65. The apparatus of claim 61, wherein, to receive the resource allocation scheme for the PC-RS, the at least one processor is configured to receive the resource allocation scheme for the PC-RS via radio resource control (RRC) signaling.

66. The apparatus of claim 61, wherein the resource allocation scheme informs the UE to rate match the PC-RS around subcarriers of the one or more DM-RS symbols.

67. The apparatus of claim 61, wherein the resource allocation scheme informs the UE to puncture the one or more DM-RS symbols in subcarriers that are reserved for the PC-RS.

68. The apparatus of claim 61, wherein the resource allocation scheme informs the UE to puncture the PC-RS in the one or more DM-RS symbols.

69. An apparatus for wireless communication, the apparatus being a user equipment (UE), comprising:
a memory; and
at least one processor coupled to the memory and configured to:
receive a first information via a physical downlink control channel (PDCCH) from a base station, wherein the PDCCH is punctured to accommodate a phase noise compensation reference signal (PC-RS) conveyed from the base station to the UE for the UE to estimate a phase noise of the UE, wherein the first information comprises at least one of a number of one or more demodulation reference signal (DM-RS) symbols or one or more locations within a subframe for transmission of the one or more DM-RS symbols from the base station; and
decode the one or more DM-RS symbols from the subframe based on the at least one of the number of the one or more DM-RS symbols or the one or more locations.

70. The apparatus of claim 69, wherein one or more bits are reserved in downlink control information (DCI) to identify the at least one of the number of the one or more DM-RS symbols or the one or more locations within the subframe for the transmission of the one or more DM-RS symbols.

71. The apparatus of claim 69, wherein the number of the one or more DM-RS symbols is one, wherein the one or more locations comprise a first symbol of physical downlink shared channel (PDSCH).

72. The apparatus of claim 69, wherein the number of the one or more DM-RS symbols is two, wherein the one or more locations comprise a first location at a beginning of physical downlink shared channel (PDSCH) and a second location in a middle of the PDSCH, the first location and the second location being separated by at least one symbol.

73. A non-transitory computer-readable medium storing computer executable code, comprising code to:
   determine at least one of a number of one or more demodulation reference signal (DM-RS) symbols or one or more locations within a subframe for transmission of the one or more DM-RS symbols;
   transmit the at least one of the number of the one or more DM-RS symbols or the one or more locations within the subframe for the transmission of the one or more DM-RS symbols to a user equipment (UE);
   determine a resource allocation scheme for a phase noise compensation reference signal (PC-RS) in relation to the one or more DM-RS symbols in the subframe, wherein the PC-RS is conveyed from a base station to the UE for the UE to estimate a phase noise of the UE; and
   transmit the resource allocation scheme for the PC-RS to the UE.

74. A non-transitory computer-readable medium storing computer executable code, comprising code to:
   determine information to be conveyed by a physical downlink control channel (PDCCH);
   allocate a phase noise compensation reference signal (PC-RS) in relation to one or more demodulation reference signal (DM-RS) symbols; and
   transmit the information to a user equipment (UE) via the PDCCH, wherein the PDCCH is punctured to accommodate the PC-RS conveyed from a base station to the UE for the UE to estimate a phase noise of the UE.

75. A non-transitory computer-readable medium storing computer executable code, comprising code to:
   receive at least one of a number of one or more demodulation reference signal (DM-RS) symbols or one or more locations within a subframe for transmission of the one or more DM-RS symbols from a base station;
   decode the one or more DM-RS symbols from the subframe based on the at least one of the number of the one or more DM-RS symbols or the one or more locations;
   receive a resource allocation scheme for a phase noise compensation reference signal (PC-RS); and
   decode the PC-RS from the subframe based on the resource allocation scheme for the PC-RS.

76. A non-transitory computer-readable medium storing computer executable code, comprising code to:
   receive a first information via a physical downlink control channel (PDCCH) from a base station, wherein the PDCCH is punctured to accommodate a phase noise compensation reference signal (PC-RS) conveyed from the base station to user equipment (UE) for the UE to estimate a phase noise of the UE, wherein the first information comprises at least one of a number of one or more demodulation reference signal (DM-RS) symbols or one or more locations within a subframe for transmission of the one or more DM-RS symbols from the base station; and
   decode the one or more DM-RS symbols from the subframe based on the at least one of the number of the one or more DM-RS symbols or the one or more locations.

* * * * *